(12) United States Patent
Uchida et al.

(10) Patent No.: US 12,347,858 B2
(45) Date of Patent: *Jul. 1, 2025

(54) POSITIVE ELECTRODE ACTIVE MATERIAL AND BATTERY INCLUDING THE SAME

(71) Applicant: Panasonic Intellectual Property Management Co., Ltd., Osaka (JP)

(72) Inventors: Shuhei Uchida, Osaka (JP); Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 765 days.

This patent is subject to a terminal disclaimer.

(21) Appl. No.: 17/152,799

(22) Filed: Jan. 20, 2021

(65) Prior Publication Data

US 2021/0143424 A1 May 13, 2021

Related U.S. Application Data

(63) Continuation of application No. PCT/JP2019/016945, filed on Apr. 22, 2019.

(30) Foreign Application Priority Data

Aug. 31, 2018 (JP) ................................. 2018-163177

(51) Int. Cl.
 *H01M 4/525* (2010.01)
 *H01M 4/36* (2006.01)
 (Continued)

(52) U.S. Cl.
 CPC ........... *H01M 4/525* (2013.01); *H01M 4/366* (2013.01); *H01M 4/505* (2013.01);
 (Continued)

(58) Field of Classification Search
 CPC ...... H01M 4/525; H01M 4/366; H01M 4/505; H01M 10/525; H01M 2004/021; H01M 2004/028
 See application file for complete search history.

(56) References Cited

U.S. PATENT DOCUMENTS 9,368,791 B2 * 6/2016 Kim ...................... H01M 4/505
2004/0201948 A1 10/2004 Hosoya et al.
(Continued)

FOREIGN PATENT DOCUMENTS

CN 1324736 C 7/2007
CN 102751531 A * 10/2012
(Continued)

OTHER PUBLICATIONS

Jarvis, K. A., Deng, Z., Allard, L. F., Manthiram, A., & Ferreira, P. J. (2011). Atomic structure of a lithium-rich layered oxide material for lithium-ion batteries: evidence of a solid solution. Chemistry of materials, 23(16), 3614-3621. (Year: 2011).*
(Continued)

*Primary Examiner* — Milton I Cano
*Assistant Examiner* — Albert Michael Hilton
(74) *Attorney, Agent, or Firm* — Rimon P.C.

(57) ABSTRACT

A positive electrode active material includes a first lithium composite oxide and a second lithium composite oxide that covers at least a part of the surface of the first lithium composite oxide. The first lithium composite oxide includes at least one selected from the group consisting of F, Cl, N, and S. The first lithium composite oxide has a crystal structure belonging to a layered structure. The second lithium composite oxide has a crystal structure belonging to space group Fd-3m. The positive electrode active material has an integrated intensity ratio $I_{(18°-20°)}/I_{(43°-46°)}$ of greater than or equal to 0.05 and less than or equal to 0.90.

23 Claims, 2 Drawing Sheets

(51) Int. Cl.
*H01M 4/505* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/028* (2013.01)

(56) References Cited

U.S. PATENT DOCUMENTS

| | | | | |
|---|---|---|---|---|
| 2010/0086854 | A1* | 4/2010 | Kumar | H01M 4/505 |
| | | | | 429/231.95 |
| 2014/0114519 | A1 | 4/2014 | Iwama et al. | |
| 2015/0380737 | A1 | 12/2015 | Kawasato et al. | |
| 2016/0013471 | A1 | 1/2016 | Kaseda et al. | |
| 2016/0190575 | A1* | 6/2016 | Yu | H01M 4/582 |
| | | | | 252/182.1 |
| 2017/0207444 | A1 | 7/2017 | Yanagihara et al. | |
| 2018/0151865 | A1* | 5/2018 | Song | H01M 4/505 |
| 2018/0205073 | A1* | 7/2018 | Natsui | H01M 4/628 |

FOREIGN PATENT DOCUMENTS

| | | |
|---|---|---|
| JP | 2016-026981 | 2/2016 |
| KR | 2016102083 A | 8/2016 |

OTHER PUBLICATIONS

Lusi, M. (2018). A rough guide to molecular solid solutions: design, synthesis and characterization of mixed crystals. CrystEngComm, 20(44), 7042-7052. (Year: 2018).*

Huo, H., Zhao, N., Sun, J., Du, F., Li, Y., & Guo, X. (2017). Composite electrolytes of polyethylene oxides/garnets interfacially wetted by ionic liquid for room-temperature solid-state lithium battery. Journal of Power Sources, 372, 1-7. (Year: 2017).*

Nakao, Y., Ozawa, K., Fujii, H., Mochiku, T., Iwai, H., Tsuchiya, Y., & Igawa, N. (2013). Electrode properties of Li2MnO3 (C2/m) for a lithium-battery cathode in several charge-discharge potential ranges. Transactions of the Materials Research Society of Japan, 38 (2), 229-233. (Year: 2013).*

Machine translation of CN-102751531-A (Year: 2024).*

International Search Report of PCT application No. PCT/JP2019/016945 dated Jul. 2, 2019.

Indian Examination Report dated Sep. 27, 2022 for the related Indian Patent Application No. 202147003044.

* cited by examiner

POSITIVE ELECTRODE ACTIVE MATERIAL AND BATTERY INCLUDING THE SAME

BACKGROUND

1. Technical Field

The present disclosure relates to a positive electrode active material and a battery including the positive electrode active material.

2. Description of the Related Art

Japanese Unexamined Patent Application Publication No. 2016-26981 discloses a lithium composite oxide including Li, Ni, Co, and Mn as essential components. The lithium composite oxide disclosed in Japanese Unexamined Patent Application Publication No. 2016-26981 has a space group of the space group R-3m and a c-axis lattice constant of 1.4208 to 1.4228 nanometers. The above lithium composite oxide has a crystal structure in which the a-axis lattice constant and the c-axis lattice constant satisfy the relationship $(3a+5.615) \leq c \leq (3a+5.655)$. Moreover, the integrated intensity ratio $(I_{003}/I_{104})$ of the (003) peak to the (104) peak in an X-ray diffraction pattern of the lithium composite oxide is 1.21 to 1.39.

SUMMARY

One non-limiting and exemplary embodiment provides a positive electrode active material used for producing a battery having a low voltage drop.

In one general aspect, the techniques disclosed here feature a positive electrode active material including a first lithium composite oxide; and a second lithium composite oxide that covers at least a part of a surface of the first lithium composite oxide. The first lithium composite oxide includes at least one selected from the group consisting of F, Cl, N, and S, the first lithium composite oxide has a crystal structure belonging to a layered structure, the second lithium composite oxide has a crystal structure belonging to space group Fd-3m. The following mathematical formula (I) is satisfied: $0.05 \leq$ Integrated intensity ratio $I_{(18°-20°)}/I_{(43°-46°)} \leq 0.90$ (I). The integrated intensity ratio $I_{(18°-20°)}/I_{(43°-46°)}$ is a ratio of an integrated intensity $I_{(18°-20°)}$ to an integrated intensity $I_{(43°-46°)}$, the integrated intensity $I_{(18°-20°)}$ is an integrated intensity of a first peak that is a maximum peak present in a range of angle of diffraction 2θ greater than or equal to 18° and less than or equal to 20° in the X-ray diffraction pattern of the positive electrode active material, and the integrated intensity $I_{(43°-46°)}$ is an integrated intensity of a second peak that is a maximum peak present in a range of angle of diffraction 2θ greater than or equal to 43° and less than or equal to 46° in the X-ray diffraction pattern of the positive electrode active material.

A battery having a low voltage drop may be produced using the positive electrode active material according to an embodiment of the present disclosure. A battery according to an embodiment of the present disclosure, which includes a positive electrode including the positive electrode active material, a negative electrode, and an electrolyte, may have a low voltage drop.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
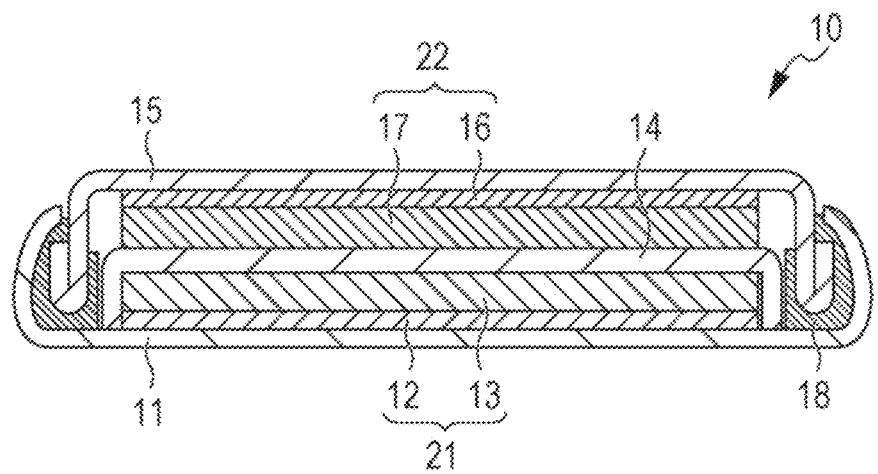
FIG. 1 is a cross-sectional view of a battery according to Embodiment 2.

Embodiments of the present disclosure are described below.

Embodiment 1

The positive electrode active material according to Embodiment 1 includes a first lithium composite oxide; and a second lithium composite oxide that covers at least a part of the surface of the first lithium composite oxide. The first lithium composite oxide includes at least one selected from the group consisting of F, Cl, N, and S, the first lithium composite oxide has a crystal structure belonging to a layered structure, the second lithium composite oxide has a crystal structure belonging to the space group Fd-3m. The following mathematical formula (I) is satisfied: $0.05 \leq$ Integrated intensity ratio $I_{(18°-20°)}/I_{(43°-46°)} \leq 0.90$ (I). The integrated intensity ratio $I_{(18°-20°)}/I_{(43°-46°)}$ is a ratio of an integrated intensity $I_{(18°-20°)}$ to an integrated intensity $I_{(43°-46°)}$, the integrated intensity $I_{(18°-20°)}$ is an integrated intensity of a first peak that is a maximum peak present in a range of angle of diffraction 2θ greater than or equal to 18° and less than or equal to 20° in the X-ray diffraction pattern of the positive electrode active material, and the integrated intensity $I_{(43°-46°)}$ is an integrated intensity of a second peak that is a maximum peak present in a range of angle of diffraction 2θ greater than or equal to 43° and less than or equal to 46° in the X-ray diffraction pattern of the positive electrode active material.

The positive electrode active material may be used for providing a battery having a low voltage drop. The expression "battery having a low voltage drop" used herein means a battery that has a high average-operating-voltage retention rate even after repeated charge-discharge cycles. Furthermore, the battery has a high capacity.

The positive electrode active material according to Embodiment 1 may be defined, for example, as follows from another viewpoint. The positive electrode active material according to Embodiment 1 is a positive electrode active material including a lithium composite oxide that includes at least one selected from the group consisting of F, Cl, N, and S and has a crystal structure belonging to a layered structure, where at least a part of the surface of the lithium composite oxide is covered with a phase having a crystal structure belonging to the space group Fd-3m, and where the positive electrode active material has an integrated intensity ratio $I_{(18°-20°)}/I_{(43°-46°)}$ of greater than or equal to 0.05 and less than or equal to 0.90.

A lithium ion battery that includes the positive electrode active material according to Embodiment 1 has an oxidation-reduction potential of about 3.4 V (vs Li/Li$^+$).

In Embodiment 1, the first lithium composite oxide includes at least one element selected from the group consisting of F, Cl, N, and S. Since at least one element selected from the above elements is an electrochemically inactive anion, it is considered that replacing some of the oxygen atoms included in the first lithium composite oxide with atoms of at least one element selected from the above elements stabilizes the crystal structure. This presumably increases the discharge capacity or operating voltage of the battery and energy density.

If the first lithium composite oxide does not include at least one element selected from the group consisting of F, Cl, N, and S, the amount of oxidation reduction of oxygen may be increased. In such a case, the stability of crystal structure is likely to become degraded due to the deintercalation of oxygen and, consequently, battery capacity may be reduced or cycle characteristics may become degraded.

In Embodiment 1, the first lithium composite oxide has a crystal structure belonging to a layered structure. As described above, the positive electrode active material according to Embodiment 1 has an integrated intensity ratio $I_{(18°-20°)}/I_{(43°-46°)}$ of greater than or equal to 0.05 and less than or equal to 0.90.

The integrated intensity ratio $I_{(18°-20°)}/I_{(43°-46°)}$ is a parameter that may be used as a measure of cation mixing that occurs in the first lithium composite oxide having a crystal structure belonging to a layered structure. The term "cation mixing" used herein refers to a state of the crystal structure of the first lithium composite oxide in which lithium ions are replaced with cations of a transition metal. The smaller the amount of cation mixing, the higher the integrated intensity ratio $I_{(18°-20°)}/I_{(43°-46°)}$. The larger the amount of cation mixing, the lower the integrated intensity ratio $I_{(18°-20°)}/I_{(43°-46°)}$.

The first lithium composite oxide includes a Li layer and a transition metal layer. If the positive electrode active material has an integrated intensity ratio $I_{(18°-20°)}/I_{(43°-46°)}$ of lower than 0.05, the Li occupancy of the transition metal layer included in the first lithium composite oxide is excessively high and the crystal structure is thermodynamically unstable. As a result, the crystal structure may collapse upon the deintercalation of Li during charging. Consequently, battery capacity may be reduced to an insufficient degree.

If the positive electrode active material has an integrated intensity ratio $I_{(18°-20°)}/I_{(43°-46°)}$ of higher than 0.90, the amount of cation mixing may be reduced and, consequently, the Li occupancy of the transition metal layer included in the first lithium composite oxide may be reduced. As a result, the number of three-dimensional Li diffusion channels may be reduced. This may degrade the diffusibility of Li. Consequently, battery capacity may be reduced to an insufficient degree.

As described above, it is considered that a sufficient degree of cation mixing between lithium ions and transition metal cation atoms occurs in the first lithium composite oxide since the positive electrode active material according to Embodiment 1 has an integrated intensity ratio $I_{(18°-20°)}/I_{(43°-46°)}$ of greater than or equal to 0.05 and less than or equal to 0.90. This may increase the number of three-dimensional lithium diffusion channels present in the first lithium composite oxide and enable the intercalation and deintercalation of a further large amount of Li.

Since the positive electrode active material according to Embodiment 1 has an integrated intensity ratio $I_{(18°-20°)}/I_{(43°-46°)}$ of greater than or equal to 0.05 and less than or equal to 0.90, in the first lithium composite oxide, not only the diffusibility of Li inside the Li layer but also the diffusibility of Li inside the transition metal layer are enhanced. In addition, the diffusibility of Li between the Li layer and the transition metal layer may also be enhanced. That is, Li may be diffused all over the cation sites in an efficient manner. Accordingly, the lithium composite oxide is suitable for increasing battery capacity compared with the regularly-arrayed lithium composite oxides (i.e., lithium composite oxides in which the amount of cation mixing is small) known in the related art.

The lithium composite oxide included in the positive electrode active material disclosed in Japanese Unexamined Patent Application Publication No. 2018-28981 has a crystal structure belonging to the space group R-3m, which is a layered structure. However, in the lithium composite oxide, cation mixing between lithium ions and transition metal cations does not occur to a sufficient degree. As disclosed in Japanese Unexamined Patent Application Publication No. 2016-28981, it has been considered that cation mixing should be reduced in lithium composite oxides.

On the other hand, the positive electrode active material according to Embodiment 1 is a positive electrode active material including the first lithium composite oxide. The first lithium composite oxide includes at least one element selected from the group consisting of F, Cl, N, and S. The first lithium composite oxide has a crystal structure belonging to a layered structure. The integrated intensity ratio $I_{(18°-20°)}/I_{(43°-46°)}$ of the positive electrode active material according to Embodiment 1, which is a parameter that may be used as a measure of cation mixing that occurs in the first lithium composite oxide, is greater than or equal to 0.05 and less than or equal to 0.90. A battery having an unexpectedly large capacity may be produced using the positive electrode active material.

In order to further increase battery capacity, the integrated intensity ratio $I_{(18°-20°)}/I_{(43°-46°)}$ may be greater than or equal to 0.11 and less than or equal to 0.85.

In order to further increase battery capacity, the integrated intensity ratio $I_{(18°-20°)}/I_{(43°-46°)}$ may be greater than or equal to 0.44 and less than or equal to 0.85.

In order to further increase battery capacity, the integrated intensity ratio $I_{(18°-20°)}/I_{(43°-46°)}$ may be greater than or equal to 0.55 and less than or equal to 0.59.

The integrated intensity of an X-ray diffraction peak may be calculated using, for example, a software attached to an X-ray diffraction apparatus (e.g., "PDXL" attached to a powder X-ray diffraction apparatus produced by Rigaku Corporation). In such a case, the integrated intensity of an X-ray diffraction peak is determined by, for example, calculating the area of the diffraction peak from the height and half-width of the diffraction peak.

In general, in an XRD pattern obtained using CuKα radiation, in the case of a crystal structure belonging to the space group C2/m, a maximum peak present in the range of diffraction angle 2θ of greater than or equal to 18° and less than or equal to 20° reflects the (001) plane, while a maximum peak present in the range of diffraction angle 2θ of greater than or equal to 43° and less than or equal to 46° reflects the (114) plane.

In general, in an XRD pattern obtained using CuKα radiation, in the case of a crystal structure belonging to the space group R-3m, a maximum peak present in the range of diffraction angle 2θ of greater than or equal to 18° and less than or equal to 20° reflects the (003) plane, while a maximum peak present in the range of diffraction angle 2θ of greater than or equal to 43° and less than or equal to 46° reflects the (104) plane.

In general, in an XRD pattern obtained using CuKα radiation, in the case of a crystal structure belonging to the space group Fm-3m, no diffraction peak is present in the range of diffraction angle 2θ of greater than or equal to 18° and less than or equal to 20°. No diffraction peak is present in the range of diffraction angle 2θ of greater than or equal to 20° and less than or equal to 23°. A maximum peak present in the range of diffraction angle 2θ of greater than or equal to 43° and less than or equal to 46° reflects the (200) plane.

In general, in an XRD pattern obtained using CuKα radiation, in the case of a cubic crystal, that is, for example, a crystal structure belonging to the space group Fd-3m, a maximum peak present in the range of diffraction angle 2θ of greater than or equal to 18° and less than or equal to 20° reflects the (111) plane, while a maximum peak present in the range of diffraction angle 2θ of greater than or equal to 43° and less than or equal to 48° reflects the (400) plane.

In order to further enhance the diffusibility of Li and thereby further increase battery capacity, in the first lithium composite oxide, the crystal structure belonging to a layered structure may be a hexagonal or monoclinic crystal structure.

In order to further enhance the diffusibility of Li and thereby further increase battery capacity, in the first lithium composite oxide, the crystal structure belonging to a layered structure may belong to at least one selected from the group consisting of the space group C2/m and the space group R-3m.

In order to further increase battery capacity, in the first lithium composite oxide, the crystal structure belonging to a layered structure may belong to the space group C2/m.

As described above, the integrated intensity ratio $I_{(18°-20°)}/I_{(43°-46°)}$ is a parameter that may be used as a measure of cation mixing that occurs in the first lithium composite oxide. The positive electrode active material according to Embodiment 1 has an integrated intensity ratio $I_{(18°-20°)}/I_{(43°-46°)}$ of greater than or equal to 0.05 and less than or equal to 0.90. In the positive electrode active material according to Embodiment 1, when, for example, the first lithium composite oxide has a crystal structure belonging to the space group C2/m, transition metal-anion octahedrons, which serve as pillars, form a three-dimensional network and enable the crystal structure to remain stable even when a large amount of Li is deintercalated. Consequently, a battery that is excellent in terms of capacity and cycle characteristics may be produced.

A crystal structure belonging to the space group C2/m is more likely to maintain a layered structure when a large amount of Li is deintercalated than a layered structure belonging to the space group R-3m. Thus, it is considered that a crystal structure belonging to the space group C2/m is less likely to collapse than a layered structure belonging to the space group R-3m.

The first lithium composite oxide may further include, in addition to the crystal structure belonging to a layered structure, another crystal structure (e.g., a crystal structure belonging to the space group Fm-3m).

The first lithium composite oxide may include F.

Since fluorine atoms have high electronegativity, replacing some of the oxygen atoms with fluorine atoms enhances cation-anion interaction and increases discharge capacity or operation voltage. For the same reasons as described above, moreover, the dissolution of F causes the localization of electrons, compared with the case where the first lithium composite oxide does not include F. This limits the deintercalation of oxygen during charging and stabilizes the crystal structure. Since the above-described advantageous effects act in a comprehensive manner, battery capacity may be further increased.

In order to increase battery capacity, a transition metal included in the transition metal layer of the first lithium composite oxide may be at least one element selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al.

In order to increase battery capacity, the first lithium composite oxide may include at least one 3d transition metal element selected from the group consisting of Mn, Co, Ni, Fe, Cu, V, Ti, Cr, and Zn.

In Embodiment 1, the first lithium composite oxide may include Mn.

Since a Mn-oxygen hybrid orbital is readily formed, the deintercalation of oxygen during charging may be reduced. This stabilizes the crystal structure and consequently further increases battery capacity.

In Embodiment 1, the first lithium composite oxide may further include Co and Ni in addition to Mn.

A Mn-oxygen hybrid orbital is readily formed. Co stabilizes the crystal structure, Ni facilitates the deintercalation of Li. For the above three reasons, a lithium composite oxide that includes Co and Ni in addition to Mn has a further stable crystal structure. Therefore, a lithium composite oxide that includes Co and Ni in addition to Mn may further increase battery capacity.

An example of the chemical composition of the first lithium composite oxide according to Embodiment 1 is described below.

The first lithium composite oxide according to Embodiment 1 may be a compound represented by Composition formula (1) below.

$$Li_xMe_yO_\alpha Q_\beta \qquad (1)$$

where Me is at least one element selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al; and Q is at least one element selected from the group consisting of F, Cl, N, and S.

In Composition formula (1), the following four mathematical formulas may be satisfied:

$1.05 \leq x \leq 1.4$, $0.6 \leq y \leq 0.35$, $1.33 \leq \alpha < 2$, and $0 < \beta \leq 0.67$.

The above first lithium composite oxide may further increase battery capacity.

Me may include at least one selected from the group consisting of Mn, Co, Ni, Fe, Cu, V, Ti, Cr, and Zn. In other words, Me may include at least one 3d transition metal element.

In the case where Me is represented by Chemical formula $Me'_{y1}Me''_{y2}$ (where Me' and Me'' each independently represent at least one element selected from the above elements for Me), "y=y1+y2" is satisfied. For example, when Me is $Mn_{0.6}Co_{0.2}$, "y=0.6+0.2=0.8" is satisfied. Similarly, in the case where Q includes two or more elements, the calculation may be done as in the case for Me.

When x is greater than or equal to 1.05, the amount of Li that can be intercalated into and deintercalated from the positive electrode active material is large and, accordingly, battery capacity may be increased.

When x is less than or equal to 1.4, the amount of Li intercalated into and deintercalated from the positive electrode active material due to the oxidation reduction reaction of Me is large. This eliminates the need to use a large amount of oxidation reduction reaction of oxygen and consequently stabilizes the crystal structure. As a result, battery capacity may be increased.

When y is greater than or equal to 0.6, the amount of Li intercalated into and deintercalated from the positive electrode active material due to the oxidation reduction reaction of Me is large. This eliminates the need to use a large amount of oxidation reduction reaction of oxygen and consequently stabilizes the crystal structure. As a result, battery capacity may be increased.

When y is less than or equal to 0.95, the amount of Li that can be intercalated into and deintercalated from the positive electrode active material is large and, accordingly, battery capacity may be increased.

When $\alpha$ is greater than or equal to 1.33, a reduction in the amount of charge compensation due to the oxidation and reduction of oxygen may be limited and, consequently, battery capacity may be increased.

When $\alpha$ is less than 2.0, an excessive increase in capacity due to the oxidation and reduction of oxygen may be prevented and the crystal structure may become stable upon the deintercalation of Li. As a result, battery capacity may be increased.

When $\beta$ is greater than 0, the crystal structure may remain stable even upon the deintercalation of Li due to the impact of electrochemical inactivity of Q. As a result, battery capacity may be increased.

When $\beta$ is less than or equal to 0.67, an increase in the impact of electrochemical inactivity of Q may be limited and, consequently, electron conductivity may be enhanced. As a result, battery capacity may be increased.

In order to further increase battery capacity, the following four mathematical formulas may be satisfied:

$1.15 \le x \le 1.3$, $0.7 \le y \le 0.85$, $1.8 \le \alpha \le 1.95$, and $0.05 \le \beta \le 0.2$.

The molar ratio of Li to Me is represented by mathematical formula (x/y).

In order to further increase battery capacity, the molar ratio (x/y) may be greater than or equal to 1.3 and less than or equal to 1.9.

When the molar ratio (x/y) is more than 1, the proportion of the number of Li atoms included in the lithium composite oxide is higher than the proportion of the number of Li atoms included in the positive electrode active materials used in the related art which is represented by, for example, composition formula $LiMnO_2$. Therefore, in such a case, a further large amount of Li may be intercalated and deintercalated.

When the molar ratio (x/y) is greater than or equal to 1.3, a large amount of Li can be used and, consequently, Li diffusion paths may be formed in an appropriate manner.

Therefore, when the molar ratio (x/y) is greater than or equal to 1.3, battery capacity may be further increased.

When the molar ratio (x/y) is less than or equal to 2.0, a reduction in the available amount of oxidation reduction reaction of Me may be limited. This eliminates the need to use a large amount of oxidation reduction reaction of oxygen. Moreover, a reduction in the Li intercalation efficiency during discharging, which occurs as a result of the destabilization of crystal structure upon the deintercalation of Li during charging, may be limited. This further increases battery capacity.

In order to further increase battery capacity, the molar ratio (x/y) may be greater than or equal to 1.3 and less than or equal to 1.7.

The molar ratio of O to Q is represented by mathematical formula ($\alpha/\beta$).

In order to further increase battery capacity, the molar ratio ($\alpha/\beta$) may be greater than or equal to 9 and less than or equal to 39.

When the molar ratio ($\alpha/\beta$) is greater than or equal to 9, a reduction in the amount of charge compensation due to the oxidation and reduction of oxygen may be limited. In addition, the impact of electrochemical inactivity of Q may be reduced and, consequently, electron conductivity may be enhanced. This may further increase battery capacity.

When the molar ratio ($\alpha/\beta$) is less than or equal to 39, an excessive increase in capacity due to the oxidation and reduction of oxygen may be prevented. This stabilizes the crystal structure upon the deintercalation of Li. Moreover, the impact of electrochemical inactivity of Q may be produced and, consequently, the crystal structure may remain stable even after the deintercalation of Li. This enables the production of a battery having a further large capacity.

In order to further increase battery capacity, the molar ratio ($\alpha/\beta$) may be greater than or equal to 9 and less than or equal to 19.

As described above, the lithium composite oxide according to Embodiment 1 may have a composition represented by composition formula $Li_xMe_yO_\alpha Q_\beta$. Thus, the lithium composite oxide according to Embodiment 1 is constituted by a cation portion and an anion portion. The cation portion is constituted by Li and Me, while the anion portion is constituted by O and Q. The molar ratio of the cation portion constituted by Li and Me to the anion portion constituted by O and Q is represented by mathematical formula (($x+y$)/($\alpha+\beta$)).

In order to further increase battery capacity, the molar ratio (($x+y$)/($\alpha+\beta$)) may be greater than or equal to 0.75 and less than or equal to 1.2.

When the molar ratio (($x+y$)/($\alpha+\beta$)) is greater than or equal to 0.75, the production of a large amount of impurities in the synthesis of the lithium composite oxide may be prevented and, consequently, battery capacity may be further increased.

When the molar ratio (($x+y$)/($a+\beta$)) is less than or equal to 1.2, the loss of the anion portion of the lithium composite oxide may be small and, consequently, the crystal structure may remain stable even after the deintercalation of lithium from the lithium composite oxide during charging.

In order to further increase battery capacity, the molar ratio (($x+y$)/($\alpha+\beta$)) may be greater than or equal to 0.75 and less than or equal to 1.0.

When the molar ratio (($x+y$)/($\alpha+\beta$)) is less than or equal to 1.0, the loss of cations included in the crystal structure occurs. In such a case, a larger number of Li diffusion paths may be formed and, consequently, battery capacity may be further increased. Furthermore, since the loss of cations is randomly arranged in the initial state, the crystal structure does not become unstable even after the deintercalation of Li. This enables the production of a long-life battery having excellent cycle characteristics.

Q may include F. That is, Q may be F.

Q may further include, in addition to F, at least one element selected from the group consisting of Cl, N, and S.

Since fluorine atoms have high electronegativity, replacing some of the oxygen atoms with fluorine atoms enhances cation-anion interaction and increases discharge capacity or operation voltage. For the same reasons as described above, moreover, the dissolution of F causes the localization of electrons, compared with the case where the first lithium composite oxide does not include F. This limits the deintercalation of oxygen during charging and stabilizes the crystal structure. Since the above-described advantageous effects act in a comprehensive manner, battery capacity may be further increased.

In order to further increase battery capacity, Me may include at least one element selected from the group consisting of Mn, Co, Ni, Fe, Cu, V, Nb, Ti, Cr, Na, Mg, Ru, W, B, Si, P, and Al.

Me may include Mn. In other words, Me may be Mn.

Me may further include, in addition to Mn, at least one element selected from the group consisting of Co, Ni, Fe, Cu, V, Nb, Mo, Ti, Cr, Zr, Zn, Na, K, Ca, Mg, Pt, Au, Ag, Ru, W, B, Si, P, and Al.

As described above, since a Mn-oxygen hybrid orbital is readily formed, the deintercalation of oxygen during charging may be reduced. Consequently, the crystal structure becomes stable and battery capacity may be further increased.

The molar ratio of Mn to Me may be greater than or equal to 60%. That is, the molar ratio of Mn to the entirety of Me including Mn (i.e., molar ratio Mn/Me) may be greater than or equal to 0.6 and less than or equal to 1.0.

As described above, when the crystal structure includes a sufficient amount of Mn, which is capable of readily combining with oxygen to form a hybrid orbital, the deintercalation of oxygen during charging may be further reduced. Consequently, the crystal structure becomes stable, and a battery having a large capacity may be achieved.

Me may further include Co and Ni in addition to Mn.

As described above, a Mn-oxygen hybrid orbital is readily formed. Co stabilizes the crystal structure. Ni facilitates the deintercalation of Li. For the above three reasons, a lithium composite oxide that includes Co and Ni in addition to Mn has a further stable crystal structure. Therefore, a lithium composite oxide that includes Co and Ni in addition to Mn may further increase battery capacity.

Me may include at least one element selected from the group consisting of B, Si, P, and Al such that the molar ratio of the selected element to Me is less than or equal to 20%.

Since B, Si, P, and Al have a high covalent bonding property, they are capable of stabilizing the crystal structure of the first lithium composite oxide. Consequently, cycle characteristics are enhanced and battery life may be further increased.

Some of the Li atoms included in the first lithium composite oxide may be replaced with alkali metal atoms, such as Na atoms or K atoms.

As described above, the positive electrode active material according to Embodiment 1 includes a second lithium composite oxide that covers at least a part of the surface of the first lithium composite oxide. In the case where a common positive electrode active material is used at high potentials, the decomposition (e.g., side reaction) of an electrolyte is facilitated and a transition metal may become eluted from the surface of the positive electrode active material. In the case where a common positive electrode active material is used at high potentials, furthermore, anionic species included in the positive electrode active material may become deintercalated as a gas. This may result in the dislocation of the crystal structure of the positive electrode active material and a reduction in the operating voltage. The second lithium composite oxide has a crystal structure belonging to the space group Fd-3m. A phase having a crystal structure belonging to the space group Fd-3m is resistant to structure destabilization which may occur during charging and discharging. Therefore, the dislocation of the crystal structure of the positive electrode active material may be reduced in the positive electrode active material according to Embodiment 1. Thus, a battery having a low average operating voltage drop may be produced using the positive electrode active material according to Embodiment 1.

An X-ray diffraction pattern of the positive electrode active material according to Embodiment 1 may have two or more peaks in a range of diffraction angle 2θ of greater than or equal to 63° and less than or equal to 68°, which are used as a measure of the presence of the second lithium composite oxide having a crystal structure belonging to the space group Fd-3m.

In the case where the X-ray diffraction pattern has the above peaks, the dislocation of the crystal structure of the positive electrode active material may be suppressed by the second lithium composite oxide with further effect. This may further reduce the drop in the average operating voltage of the battery.

the following mathematical formula (I) is satisfied:

$$1.18 \leq \text{Integrated intensity ratio } I_{(63°\text{-}65°)}/I_{(65°\text{-}66°)} \leq 2.0 \quad (II).$$

where, the integrated intensity ratio $I_{(63°\text{-}65°)}/I_{(65°\text{-}66°)}$ is a ratio of an integrated intensity $I_{(63°\text{-}65°)}$ to an integrated intensity $I_{(65°\text{-}66°)}$, the integrated intensity $I_{(65°\text{-}66°)}$ is an integrated intensity of a third peak that is a maximum peak present in a range of angle of diffraction 2θ greater than or equal to 65° and less than or equal to 66° in the X-ray diffraction pattern of the positive electrode active material, and the integrated intensity $I_{(63°\text{-}65°)}$ is an integrated intensity of a fourth peak that is a maximum peak present in a range of angle of diffraction 2θ greater than or equal to 63° and less than or equal to 65° in the X-ray diffraction pattern of the positive electrode active material.

The integrated intensity ratio $I_{(63°\text{-}65°)}/I_{(65°\text{-}66°)}$ is a parameter that may be used as a measure of the proportion of a crystal structure belonging to the space group Fd-3m. It is considered that, the larger the proportion of a crystal structure belonging to the space group Fd-3m, the higher the integrated intensity ratio $I_{(63°\text{-}65°)}/I_{(65°\text{-}66°)}$.

When the integrated intensity ratio $I_{(63°\text{-}65°)}/I_{(65°\text{-}66°)}$ is greater than or equal to 1.18 and less than or equal to 2.0, the voltage drop of the battery may be further reduced.

In order to further reduce the voltage drop, the integrated intensity ratio $I_{(63°\text{-}65°)}/I_{(65°\text{-}66°)}$ may be greater than or equal to 1.22 and less than or equal to 1.50.

In order to further reduce the voltage drop, the integrated intensity ratio $I_{(63°\text{-}65°)}/I_{(65°\text{-}66°)}$ may be greater than or equal to 1.22 and less than or equal to 1.28.

The state in which "the second lithium composite oxide covers at least a part of the surface of the first lithium composite oxide" may be a state in which the second lithium composite oxide is in contact with at least a part of the surface of the first lithium composite oxide. The second lithium composite oxide may be deposited on the surface of the first lithium composite oxide in the form of a coating film.

The second lithium composite oxide may cover ail over the surface of the first lithium composite oxide. For example, the positive electrode active material according to Embodiment 1 may have a core-shell structure constituted by the first lithium composite oxide serving as a core and the second lithium composite oxide serving as a shell that covers the surface of the core.

In the case where the entire surface of the first lithium composite oxide is covered with the second lithium composite oxide, the dislocation of the crystal structure of the positive electrode active material may be reduced with further effect and, consequently, the voltage drop may be further reduced.

In the positive electrode active material according to Embodiment 1, the second lithium composite oxide may be mixed with at least a part of the surface of the first lithium composite oxide to form a solid solution.

In the case where a solid solution is formed, the elution (e.g., deintercalation) of the metal elements may be further reduced and, consequently, the cycle characteristics of the battery may be further enhanced.

In order to increase battery capacity and reduce the voltage drop, the molar ratio of the second lithium composite oxide to the first lithium composite oxide in the positive electrode active material according to Embodiment 1 may be less than or equal to 50%.

In order to increase battery capacity and reduce the voltage drop, the molar ratio of the second lithium composite oxide to the first lithium composite oxide in the positive electrode active material according to Embodiment 1 may be greater than or equal to 6% and less than or equal to 29%.

In order to increase battery capacity and reduce the voltage drop, the second lithium composite oxide may have a thickness of greater than or equal to 0.1 nanometers and less than or equal to 30 nanometers.

In order to increase battery capacity and reduce the voltage drop, the second lithium composite oxide may have a thickness of greater than or equal to 0.5 nanometers and less than or equal to 8 nanometers.

The second lithium composite oxide may be a known lithium composite oxide having a spinel crystal structure. The second lithium composite oxide may be, for example, a lithium manganese composite oxide (i.e., lithium manganese oxide). Examples of the lithium manganese composite oxide having a spinel crystal structure include $LiMn_2O_4$, $Li_{1+x}Mn_{2-x}O_4$ (0<x<2), $LiMn_{2-x}Al_xO_4$ (0<x<2), and $LiMn_{1.5}Ni_{0.5}O_4$. The lithium manganese composite oxide may be mixed with a small amount of lithium nickel oxide (e.g., $LiNiO_2$ or $LiNi_{1-x}M_xO_2$ (0<x<1; M is Co or Al)). This may limit the elution of manganese and the decomposition of an electrolyte solution.

The second lithium composite oxide may be represented by Composition formula (2) below.

$$Li_aA_bO_c \quad (2)$$

where

A is at least one element selected from the group consisting of Ni, Co, Mn, Si, Al, P, S, Ti, V, Cr, Fe, Cu, Zn, Ga, Zr, Nb, Mo, Ru, Ta, and W; and the following three mathematical formulas are satisfied:

$0<a\leq2$, $1.8\leq b\leq2.2$, and

$3.5\leq c\leq4.5$.

The positive electrode active material according to Embodiment 1 may include the first and second lithium composite oxides as main components. In other words, the positive electrode active material according to Embodiment 1 may include the first and second lithium composite oxides such that the mass ratio of the first and second lithium composite oxides to the entire positive electrode active material is greater than or equal to 50%. Such a positive electrode active material may further increase battery capacity.

In order to further increase battery capacity, the above mass ratio may be greater than or equal to 70%.

In order to further increase battery capacity, the above mass ratio may be greater than or equal to 90%.

The positive electrode active material according to Embodiment 1 may further include, in addition to the first and second lithium composite oxides, inevitable impurities.

The positive electrode active material according to Embodiment 1 may include starting materials thereof as unreacted substances. The positive electrode active material according to Embodiment 1 may include a by-product of the synthesis of the first and second lithium composite oxides. The positive electrode active material according to Embodiment 1 may include a decomposition product produced by the decomposition of the first and second lithium composite oxides.

The positive electrode active material according to Embodiment 1 may include only the first and second lithium composite oxides, except inevitable impurities.

A positive electrode active material including only the first and second lithium composite oxides may further increase battery capacity and enhance cycle characteristics.

Method for Producing Positive Electrode Active Material

A first example of the method for producing the positive electrode active material according to Embodiment 1 is described below. In the first example, the positive electrode active material includes only the first and second lithium composite oxides.

First, a precursor of the first lithium composite oxide is prepared. The precursor of the first lithium composite oxide may be prepared by, for example, the method described below.

A raw material containing Li, a raw material containing Me, and a raw material containing Q are prepared.

Examples of the raw material containing Li include a lithium oxide, such as $Li_2O$ or $Li_2O_2$; a lithium salt, such as LiF, $Li_2CO_3$, or LiOH; and a lithium composite oxide, such as $LiMeO_2$ or $LiMe_2O_4$.

Examples of the raw material containing Me include a metal oxide, such as $Me_2O_3$; a metal salt, such as $MeCO_3$ or $Me(NO_3)_2$; a metal hydroxide, such as $Me(OH)_2$ or MeOOH; and a lithium composite oxide, such as $LiMeO_2$ or $LiMe_2O_4$.

For example, in the case where Me is Mn, examples of a raw material containing Mn include a manganese oxide, such as $MnO_2$ or $Mn_2O_3$; a manganese salt, such as $MnCO_3$ or $Mn(NO_3)_2$; a manganese hydroxide, such as $Mn(OH)_2$ or MnOOH; and a lithium manganese composite oxide, such as $LiMnO_2$ or $LiMn_2O_4$.

Examples of the raw material containing Q include a halogenated lithium, a transition metal halide, a transition metal sulfide, and a transition metal nitride.

In the case where Q is F, examples of a raw material containing F include LiF and a transition metal fluoride.

The above raw materials are prepared such that the molar ratio represented by Composition formula (1) is satisfied. In this manner, x, y, α, and β may be changed within the ranges represented by Composition formula (1). The raw materials prepared are mixed with one another by, for example, dry process or wet process and subsequently mechanochemically reacted with one another in a mixing apparatus, such as a planetary ball mill, for 10 hours or more. Hereby, a precursor of the first lithium composite oxide is prepared.

The precursor of the first lithium composite oxide is subsequently subjected to a heat treatment, which causes a part of the atoms to be regularly arranged and enables the production of a bulk first lithium composite oxide.

The conditions under which the heat treatment is conducted are set appropriately such that the first lithium composite oxide can be produced. The optimal conditions for the heat treatment vary by the conditions other than the heat treatment conditions and the composition that is to be achieved. The inventors of the present invention found that, the higher the temperature at which the heat treatment is conducted and the larger the amount of time during which the heat treatment is conducted, the smaller the amount of cation mixing that occurs in the first lithium composite oxide. Thus, a manufacturer may determine the heat treatment conditions in accordance with the tendency. The heat treatment temperature and time may be selected from, for example, 600° C. to 900° C. and 30 minutes to 1 hour, respectively. Examples of the atmosphere in which the heat treatment is conducted include an air atmosphere, an oxygen atmosphere, and an inert atmosphere (e.g., a nitrogen atmosphere or an argon atmosphere).

The first lithium composite oxide may be produced by adjusting the raw materials, the conditions under which the raw materials are mixed, and the heat treatment conditions as described above.

Using a lithium transition metal composite oxide as a raw material may reduce the amount of energy required by element mixing. This increases the purity of the first lithium composite oxide.

The first lithium composite oxide is dispersed in, for example, a solution used for the preparation of the second lithium composite oxide (hereinafter, this solution is referred to simply as "coating solution"). The resulting dispersion liquid is stirred. Hereby, a precursor of the positive electrode active material, which includes the first lithium composite oxide and a precursor of the second lithium composite oxide which is deposited on the surface of the first lithium composite oxide, is prepared. The amount of time during which stirring is performed may be, for example, 10 minutes to 1 hour. The concentration of the raw material for the second lithium composite oxide in the coating solution is, for example, 0.0001 to 1 mol/L or may be 0.001 to 0.1 mol/L. The coating solution may be an aqueous solution.

In the case where the second lithium composite oxide is represented by Composition formula (2), the coating solution includes, for example, a raw material containing the element A. Examples of the raw material containing the element A include an oxide, such as $A_2O_3$; a salt of A, such as $A(CH_3COO)_2$, $ACO_3$, or $A(NO_3)_2$; a hydroxide, such as $A(OH)_2$ or AOOH; and a lithium composite oxide, such as $LiAO_2$ or $LiA_2O_4$. Examples of a solvent included in the coating solution include water, ethanol, and acetone.

For example, in the case where A is Mn, examples of a raw material containing Mn include a manganese oxide, such as $MnO_2$ or $Mn_2O_3$; a manganese salt, such as $Mn(CH_3COO)_2$, $MnCO_3$, $Mn(NO_3)_2$; a manganese hydroxide, such as $Mn(OH)_2$ or MnOOH; and a lithium manganese composite oxide, such as $LiMnO_2$ or $LiMn_2O_4$.

Subsequently, the precursor of the positive electrode active material is subjected to a heat treatment, which causes the precursor of the second lithium composite oxide to react with, for example, lithium deposited on the surface of the first lithium composite oxide to form a second lithium composite oxide having a spinel crystal structure.

The conditions under which the heat treatment is conducted may be set appropriately such that the second lithium composite oxide is produced. The optimal conditions for the heat treatment vary by the conditions other than the heat treatment conditions and the composition that is to be achieved. The heat treatment temperature and time may be selected from, for example, 400° C. to 900° C. and 30 minutes to 6 hours, respectively. The heat treatment temperature may be greater than or equal to 700° C. Examples of the atmosphere in which the heat treatment is conducted include an air atmosphere, an oxygen atmosphere, and an inert atmosphere (e.g., a nitrogen atmosphere or an argon atmosphere).

The second lithium composite oxide is formed on at least a part of the surface of the first lithium composite oxide by adjusting the raw materials, the conditions under which the raw materials are mixed, and the heat treatment conditions as described above. The positive electrode active material according to Embodiment 1 may be produced in the above-described manner.

A second example of the method for producing the positive electrode active material according to Embodiment 1 is described below. In the second example, a precursor of the second lithium composite oxide is deposited on the surface of a precursor of the first lithium composite oxide which has not been subjected to a heat treatment, and both of the precursors of the first and second lithium composite oxides are subjected to a heat treatment simultaneously. Specifically, a precursor of the first lithium composite oxide is prepared as in the method of the first example, the precursor is dispersed in, for example, the coating solution, and the resulting dispersion liquid is stirred. Hereby, a precursor of the positive electrode active material which includes a precursor of the first lithium composite oxide and a precursor of the second lithium composite oxide which is deposited on the surface of the precursor of the first lithium composite oxide is prepared. The coating solution used in the second example, the amount of time during which stirring is performed in the second example, and the heat treatment conditions used in the second example may be the same as those in the first example.

The compositions of the first and second lithium composite oxides may be determined by ICP atomic emission spectroscopy, inert gas fusion-infrared absorption, ion chromatography, or any combination of the above analysis methods.

The space groups of the crystal structures in the first and second lithium composite oxides may be determined by powder X-ray analysis of the positive electrode active material.

As described above, the first example of the method for producing the positive electrode active material according to Embodiment 1 includes a step (a) of preparing raw materials; a step (b) of conducting a mechanochemical reaction of the raw materials to produce a precursor of the first lithium composite oxide; a step (c) of subjecting the precursor of the first lithium composite oxide to a heat treatment to produce a bulk first lithium composite oxide; a step (d) of forming a precursor of the second lithium composite oxide on at least a part of the surface of the first lithium composite oxide; and a step (e) of subjecting the precursor of the second lithium composite oxide to a heat treatment to produce a positive electrode active material.

The second example of the method for producing the positive electrode active material according to Embodiment 1 includes a step (a) of preparing the raw materials; a step (b) of conducting a mechanochemical reaction of the raw materials to produce a precursor of a bulk first lithium composite oxide; a step (c) of forming a precursor of the second lithium composite oxide on at least a part of the surface of the precursor of the first lithium composite oxide; and a step (d) of subjecting the precursors of the first and second lithium composite oxides to a heat treatment to produce a positive electrode active material.

The raw material may be a mixed raw material. In the mixed raw material, the ratio of Li to Me may be greater than or equal to 1.3 and less than or equal to 1.9.

A lithium compound used as a raw material may be prepared by a known method.

The raw material may be a mixed raw material. In the mixed raw material, the ratio of Li to Me may be greater than or equal to 1.3 and less than or equal to 1.7.

In the step (b), the mechanochemical reaction of the raw materials may be conducted using a ball mill.

As described above, the first lithium composite oxide may be synthesized by conducting a mechanochemical reaction of the precursor (e.g., LiF, $Li_2O$, a transition metal oxide, or a lithium transition metal composite oxide) with a planetary ball mill.

In the step (d) of the first example, the first lithium composite oxide may be dispersed in the coating solution and the precursor of the second lithium composite oxide may be formed on at least a part of the surface of the first lithium composite oxide. In the step (c) of the second example, the precursor of the first lithium composite oxide may be dispersed in the coating solution and the precursor of the second lithium composite oxide may be formed on at least a part of the surface of the precursor of the first lithium composite oxide.

In the case where a positive electrode active material including a component other than the first or second lithium composite oxide is produced, the above production method may further include a step of mixing the synthesis product obtained by the heat treatment of the precursor with the other component subsequent to the step (e) of the first example or the step (d) of the second example. In the case where a positive electrode active material including only the first and second lithium composite oxides is produced, the synthesis product obtained by conducting the heat treatment of the precursor in the step (e) of the first example or the step (d) of the second example may be directly used as a positive electrode active material.

Embodiment 2

Embodiment 2 is described below. The items described in Embodiment 1 may be omitted as needed.

A battery according to Embodiment 2 includes a positive electrode including the positive electrode active material according to Embodiment 1, a negative electrode, and an electrolyte.

The battery according to Embodiment 2 has a large capacity.

The positive electrode included in the battery according to Embodiment 2 may include a positive electrode active material layer. The positive electrode active material layer may include the positive electrode active material according to Embodiment 1 as a main component. In other words, the mass ratio of the positive electrode active material to the entire positive electrode active material layer may be greater than or equal to 50%.

Such a positive electrode active material layer may further increase battery capacity.

The above mass ratio may be greater than or equal to 70%.

Such a positive electrode active material layer may further increase battery capacity.

The above mass ratio may be greater than or equal to 90%.

Such a positive electrode active material layer may further increase battery capacity.

The battery according to Embodiment 2 may be, for example, a lithium-ion secondary battery, a nonaqueous electrolyte secondary battery, or a solid-state battery.

The negative electrode included in the battery according to Embodiment 2 may include a negative electrode active material capable of occluding and releasing lithium ions. Alternatively, the negative electrode may include a material that allows lithium metal to dissolve from the material into the electrolyte during discharging and to precipitate on the material during charging.

The electrolyte included in the battery according to Embodiment 2 may be a nonaqueous electrolyte (e.g., a nonaqueous electrolyte solution).

The electrolyte included in the battery according to Embodiment 2 may be a solid electrolyte.

FIG. 1 is a cross-sectional view of a battery 10 according to Embodiment 2.

As illustrated in FIG. 1, the battery 10 includes a positive electrode 21, a negative electrode 22, a separator 14, a casing 11, a sealing plate 15, and a gasket 18.

The separator 14 is interposed between the positive electrode 21 and the negative electrode 22.

The positive electrode 21, the negative electrode 22, and the separator 14 are impregnated with, for example, a nonaqueous electrolyte (e.g., a nonaqueous electrolyte solution).

The positive electrode 21, the negative electrode 22, and the separator 14 form an electrode group.

The electrode group is housed in the casing 11.

The casing 11 is sealed with the gasket 18 and the sealing plate 15.

The positive electrode 21 includes a positive electrode current collector 12 and a positive electrode active material layer 13 disposed on the positive electrode current collector 12.

The positive electrode current collector 12 is composed of, for example, a metal material (e.g., at least one selected from the group consisting of aluminum, stainless steel, nickel, iron, titanium, copper, palladium, gold, and platinum or an alloy thereof).

The positive electrode current collector 12 may be omitted. In such a case, the casing 11 is used as a positive electrode current collector.

The positive electrode active material layer 13 includes the positive electrode active material according to Embodiment 1.

The positive electrode active material layer 13 may optionally include, for example, an additive (e.g., a conductant agent, an ion conduction agent, or a binding agent) as needed.

The negative electrode 22 includes a negative electrode current collector 16 and a negative electrode active material layer 17 disposed on the negative electrode current collector 16.

The negative electrode current collector 16 is composed of, for example, a metal material (e.g., at least one selected from the group consisting of aluminum, stainless steel, nickel, iron, titanium, copper, palladium, gold, and platinum or an alloy thereof).

The negative electrode current collector 16 may be omitted. In such a case, the sealing plate 15 is used as a negative electrode current collector.

The negative electrode active material layer 17 includes a negative electrode active material.

The negative electrode active material layer 17 may optionally include, for example, an additive (e.g., a conductant agent, an ion conduction agent, or a binding agent) as needed.

Examples of the negative electrode active material include a metal material, a carbon material, an oxide, a nitride, a tin compound, and a silicon compound.

The metal material may be an elemental metal or an alloy. Examples of the metal material include lithium metal and a lithium alloy.

Examples of the carbon material include natural graphite, coke, graphitizing carbon, carbon fibers, spherical carbon, artificial graphite, and amorphous carbon.

From the viewpoint of capacity density, silicon (Si), tin (Sn), a silicon compound, and a tin compound may be used as a negative electrode active material. The silicon compound and the tin compound may be either an alloy or a solid solution.

Examples of the silicon compound include $SiO_x$ (where $0.05 < x < 1.95$). A compound obtained by replacing some of the silicon atoms included in $SiO_x$ with atoms of another element may also be used; this compound is an alloy or a solid solution. The other element is at least one element selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ (where $0 < x < 2$), $SnO_2$, and $SnSiO_3$. One tin compound selected from the above tin compounds may be used alone. Two or more tin compounds selected from the above tin compounds may be used in combination.

The shape of the negative electrode active material is not limited. A negative electrode active material having a known shape (e.g., particulate or fibrous) may be used.

The method for charging lithium into the negative electrode active material layer 17 (i.e., causing the negative electrode active material layer 17 to occlude lithium) is not limited. Specific examples of the above method include (a) a method in which lithium is deposited on the negative electrode active material layer 17 by a gas-phase method, such as vacuum vapor deposition; and (b) a method in which a lithium metal foil and the negative electrode active material layer 17 are heated while they are brought into contact with each other. In either of the above methods, lithium is diffused into the negative electrode active material layer 17 by heat. Alternatively, a method in which lithium is electrochemically occluded into the negative electrode active material layer 17 may also be used. Specifically, a battery is prepared using a negative electrode 22 that does not contain lithium and a lithium metal foil (negative electrode). The battery is subsequently charged in order to cause the negative electrode 22 to occlude lithium.

Examples of the binding agent included in the positive electrode 21 and the negative electrode 22 include polyvinylidene fluoride, polytetrafluoroethylene, polyethylene, polypropylene, an aramid resin, polyamide, polyimide, polyamide imide, polyacrylonitrile, polyacrylic acid, a polymethyl acrylate ester, a polyethyl acrylate ester, a hexyl polyacrylate ester, polymethacrylic acid, a polymethyl methacrylate ester, a polyethyl methacrylate ester, a polyhexyl methacrylate ester, polyvinyl acetate, polyvinylpyrrolidone, polyether, polyethersulfone, hexafluoropolypropylene, a styrene butadiene rubber, and carboxymethyl cellulose.

Examples of the binding agent further include copolymers of two or more materials selected from the group consisting of tetrafluoroethylene, hexafluoroethane, hexafluoropropylene, perfluoroalkyl vinyl ether, vinylidene fluoride, chlorotrifluoroethylene, ethylene, propylene, pentafluoropropylene, a fluoromethyl vinyl ether, acrylic acid, and hexadiene. Alternatively, a mixture of two or more binding agents selected from the above materials may be used.

Examples of the conductant agent included in the positive electrode 21 and the negative electrode 22 include graphite, carbon black, conductive fibers, graphite fluoride, a metal powder, conductive whiskers, a conductive metal oxide, and an organic conductive material.

Examples of the graphite include natural graphite and artificial graphite.

Examples of the carbon black include acetylene black, Ketjenblack, channel black, furnace black, lamp black, and thermal black.

Examples of the metal powder include an aluminum powder.

Examples of the conductive whiskers include zinc oxide whiskers and potassium titanate whiskers.

Examples of the conductive metal oxide include titanium oxide.

Examples of the organic conductive material include phenylene derivatives.

At least a part of the surface of the binding agent may be covered with the conductant agent. For example, the surface of the binding agent may be covered with carbon black. In such a case, battery capacity may be increased.

The material constituting the separator 14 is a material having high ionic permeability and a sufficiently high mechanical strength. Examples of the material constituting the separator 14 include a microporous thin-film, a woven fabric, and a nonwoven fabric. Specifically, it is desirable that the separator 14 be made of a polyolefin, such as polypropylene or polyethylene. A separator 14 made of a polyolefin has excellent durability and produces a shutdown function when the temperature is increased to an excessive degree. The thickness of the separator 14 is, for example, 10 to 300 μm (or 10 to 40 μm). The separator 14 may be a single-layer film composed of only one material. Alternatively, the separator 14 may be a composite film (i.e., multilayer film) composed of two or more materials. The porosity of the separator 14 is, for example, 30% to 70% (or 35% to 60%). The term "porosity" used herein refers to the ratio of the volume of pores to the total volume of the separator 14. Porosity may be measured by a mercury penetration method or the like.

The nonaqueous electrolyte solution include a nonaqueous solvent and a lithium salt dissolved in the nonaqueous solvent.

Examples of the nonaqueous solvent include a cyclic carbonate ester solvent, a chain carbonate ester solvent, a cyclic ether solvent, a chain ether solvent, a cyclic ester solvent, a chain ester solvent, and a fluorine solvent.

Examples of the cyclic carbonate ester solvent include ethylene carbonate, propylene carbonate, and butylene carbonate.

Examples of the chain carbonate ester solvent include dimethyl carbonate, ethyl methyl carbonate, and diethyl carbonate.

Examples of the cyclic ether solvent include tetrahydrofuran, 1,4-dioxane, and 1,3-dioxolane.

Examples of the chain ether solvent include 1,2-dimethoxyethane and 1,2-diethoxyethane.

Examples of the cyclic ester solvent include γ-butyrolactone.

Examples of the chain ester solvent include methyl acetate.

Examples of the fluorine solvent include fluoroethylene carbonate, methyl fluoropropionate, fluorobenzene, fluoroethyl methyl carbonate, and fluorodimethylene carbonate.

One nonaqueous solvent selected from the above materials may be used alone as a nonaqueous solvent. Alternatively, two or more nonaqueous solvents selected from the above materials may be used in combination as a nonaqueous solvent.

The nonaqueous electrolyte solution may include at least one fluorine solvent selected from the group consisting of fluoroethylene carbonate, methyl fluoropropionate, fluorobenzene, fluoroethyl methyl carbonate, and fluorodimethylene carbonate.

When the nonaqueous electrolyte solution includes at least one fluorine solvent selected from the above materials, the oxidation resistance of the nonaqueous electrolyte solution may be enhanced.

As a result, the battery 10 can be operated with stability even in the case where the battery 10 is charged at a high voltage.

The electrolyte included in the battery according to Embodiment 2 may be a solid electrolyte.

Examples of the solid electrolyte include an organic polymer solid electrolyte, an oxide solid electrolyte, and a sulfide solid electrolyte.

Examples of the organic polymer solid electrolyte include a compound produced from a high-molecular-weight compound and a lithium salt. Examples of such a compound include lithium polystyrene sulfonate.

The high-molecular-weight compound may have an ethylene oxide structure. When the high-molecular-weight compound has an ethylene oxide structure, the content of the lithium salt can be increased. This further increases ionic conductivity.

Examples of the oxide solid electrolyte include:
(i) a NASICON solid electrolyte, such as $LiTi_2(PO_4)_3$ or a substitution product thereof;
(ii) a perovskite solid electrolyte, such as $(LaLi)TiO_3$;
(iii) a LISICON solid electrolyte, such as $Li_{14}ZnGe_4O_{16}$, $Li_4SiO_4$, $LiGeO_4$, or a substitution product thereof;
(iv) a garnet solid electrolyte, such as $Li_{17}La_3Zr_2O_{12}$ or a substitution product thereof;
(v) $Li_3N$ or a H-substitution product thereof; and
(vi) $Li_3PO_4$ or an N-substitution product thereof.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. LiX (where X is F, Cl, Br, or I), $MO_y$, or $Li_xMO_y$ (where M is any of P, Si, Ge, B, Al, Ga, and In, and x and y each independently represent a natural number) may be added to the sulfide solid electrolyte.

Among these, a sulfide solid electrolyte is rich in terms of formability and has high ionic conductivity. Accordingly, using a sulfide solid electrolyte as a solid electrolyte may further increase the energy density of the battery.

Among the above sulfide solid electrolytes, $Li_2S$—$P_2S_5$ has high electrochemical stability and a high ionic conductivity. Accordingly, using $Li_2S$—$P_2S_5$ as a solid electrolyte may further increase the energy density of the battery.

A solid electrolyte layer that includes the solid electrolyte may further include the above nonaqueous electrolyte solution.

Since the solid electrolyte layer includes the nonaqueous electrolyte solution, the migration of lithium ions between the active materials and the solid electrolyte may be facilitated. This may further increase the energy density of the battery.

The solid electrolyte layer may include a gel electrolyte or an ionic liquid.

Examples of the gel electrolyte include a polymer material impregnated with the nonaqueous electrolyte solution. Examples of the polymer material include polyethylene oxide, polyacrylonitrile, polyvinylidene fluoride, and polymethyl methacrylate. Examples of the polymer material further include a polymer including an ethylene oxide bond.

Examples of the cation included in the ionic liquid include
(i) a cation of an aliphatic chain quaternary ammonium salt, such as tetraalkylammonium;
(ii) a cation of an aliphatic chain quaternary phosphonium salt, such as tetraalkylphosphonium;
(iii) an aliphatic cyclic ammonium, such as pyrrolidinium, morpholinium, imidazolinium, tetrahydropyrimidinium, piperazinium, or piperidinium; and
(iv) a nitrogen-containing heterocyclic aromatic cation, such as pyridinium or imidazolium.

The anion constituting the ionic liquid is $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may include a lithium salt.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from the above materials may be used alone as a lithium salt. Alternatively, a mixture of two or more lithium salts selected from the above materials may be used as a lithium salt. The concentration of the lithium salt is, for example, 0.5 to 2 mol/liter.

As for the shape of the battery according to Embodiment 2, the battery is a coin-shaped battery, a cylindrical battery, a rectangular battery, a sheet-shaped battery, a button-shaped battery (i.e., "button cell"), a flattened battery, or a layered battery.

EXAMPLES

Example 1

Preparation of Positive Electrode Active Material

A mixture of LiF, $Li_2MnO_3$, $LiMnO_2$, $LiCoO_2$, and $LiNiO_2$ was prepared such that the mixture had a Li/Mn/Co/Ni/O/F molar ratio of 1.2/0.54/0.13/0.13/1.9/0.1.

The mixture and an appropriate amount of zirconia balls having a diameter of 3 mm were charged into a container having a volume of 45 milliliters. The container was hermetically sealed in an argon glove box. The container was made of zirconia.

Subsequently, the container was removed from the argon glove box. The mixture contained in the container was subjected to a planetary ball mill at 600 rpm for 30 hours in an argon atmosphere to form a precursor of a first lithium composite oxide.

The precursor was subjected to a powder X-ray diffraction measurement.

The results of the measurement confirmed that the space group of the precursor was Fm-3m.

The above precursor was subjected to a heat treatment at 700° C. for 1 hour in an air atmosphere. Hereby, a bulk first lithium composite oxide was prepared.

The composition of the first lithium composite oxide which was determined from the molar ratio between the raw materials is represented by $Li_{1.2}Mn_{0.54}Co_{0.13}Ni_{0.13}O_{1.9}F_{0.1}$ as described in Table 1.

The first lithium composite oxide was dispersed in an aqueous solution of $Mn(CH_3COO)_2 \cdot 4H_2O$. Subsequently, stirring was performed for 30 minutes. The aqueous solution of $Mn(CH_3COO)_2 \cdot 4H_2O$ was the coating solution, that is, an aqueous solution used for preparing a second lithium composite oxide. Hereby, the surface of the first lithium composite oxide was covered with a precursor of the second lithium composite oxide, that is, a precursor of a positive electrode active material was prepared. In other words, a precursor of a positive electrode active material which included the first lithium composite oxide and a precursor of the second lithium composite oxide which was deposited on the surface of the first lithium composite oxide was prepared. The concentration of the manganese acetate in the aqueous solution of $Mn(CH_3COO)_2 \cdot 4H_2O$ was 0.1 mol/L.

Then, the precursor of the positive electrode active material was subjected to a heat treatment at 750° C. for 5 hours in an air atmosphere to form a second lithium composite oxide. Hereby, a positive electrode active material of Example 1 was prepared.

Figure 2:
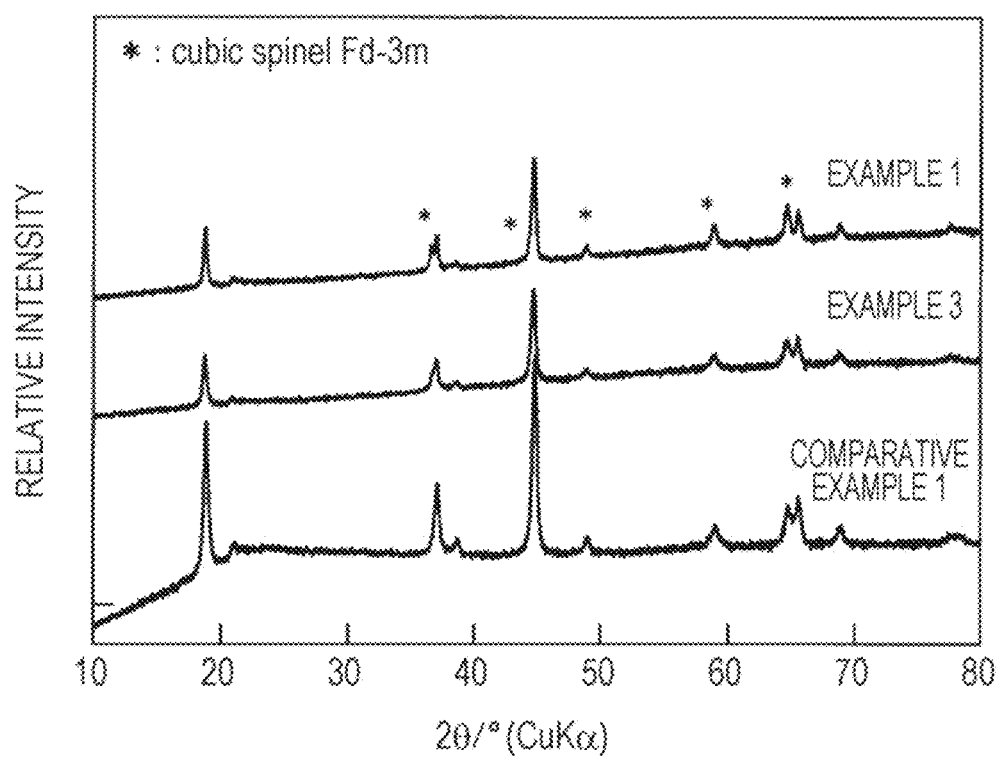
FIG. 2 is a graph illustrating powder X-ray diffraction patterns of the positive electrode active materials prepared in Example 1, Example 3, and Comparative example 1.

The positive electrode active material prepared in Example 1 was subjected to a powder X-ray diffraction measurement. FIG. 2 is a graph illustrating the results of the powder X-ray diffraction measurement of the positive electrode active material prepared in Example 1. The space groups of the crystal structures of the first and second lithium composite oxides included in the positive electrode active material prepared in Example 1 were identified on the basis of the results of the powder X-ray analysis measurement. The integrated intensity ratios $I_{(18°-20°)}/I_{(43°-46°)}$ and $I_{(63°-65°)}/I_{(65°-66°)}$ of the positive electrode active material prepared in Example 1 were also determined. Table 1 describes the results.

Figure 3:
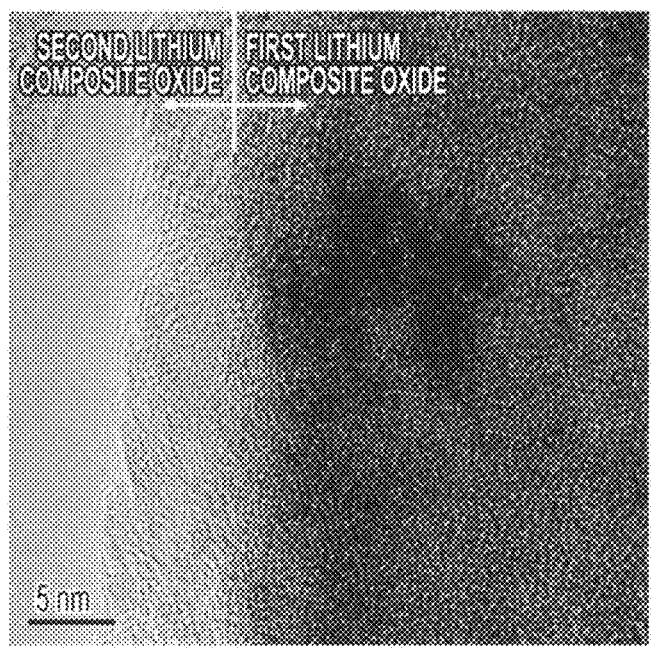
FIG. 3 is an image of a cross section of the positive electrode active material prepared in Example 1 taken with a transmission electron microscope.

The positive electrode active material prepared in Example 1 was observed with a TEM. FIG. 3 is a TEM image of the positive electrode active material prepared in Example 1. Using the TEM image of the positive electrode active material prepared in Example 1, it was confirmed that the surface of the first lithium composite oxide was covered with a layer composed of the second lithium composite oxide. The thickness of the second lithium composite oxide was determined on the basis of the TEM image. Table 3 describes the results.

Table 3 describes the molar ratio of the second lithium composite oxide to the first lithium composite oxide and the composition of the second lithium composite oxide. The molar ratio of the second lithium composite oxide to the first lithium composite oxide was calculated on the basis of the volumes estimated from TEM observation images and the crystal structures observed by cross-sectional TEM. The composition of the second lithium composite oxide was identified on the basis of a surface composition analysis, such as X-ray photoelectron spectroscopy.

Preparation of Battery

With 70 parts by mass of the positive electrode active material prepared in Example 1, 20 parts by mass of acetylene black, 10 parts by mass of polyvinylidene fluoride (hereinafter, abbreviated as "PVDF"), and an appropriate amount of N-methyl-2-pyrrolidone (hereinafter, abbreviated as "NMP") were mixed. Hereby, a positive electrode mixture slurry was prepared. The acetylene black served as a conductant agent. The polyvinylidene fluoride served as a binding agent.

The positive electrode mixture slurry was applied onto one of the surfaces of a positive electrode current collector formed of an aluminum foil having a thickness of 20 micrometers.

The positive electrode mixture slurry was dried and then rolled. Hereby, a positive electrode plate including a positive electrode active material layer was prepared.

The positive electrode plate was stamped into a predetermined shape. Hereby, a circular positive electrode having a diameter of 12.5 mm was prepared.

A lithium metal foil having a thickness of 300 micrometers was stamped into a predetermined shape. Hereby, a circular negative electrode having a diameter of 14 mm was prepared.

Fluoroethylene carbonate (hereinafter, abbreviated as "FEC"), ethylene carbonate (hereinafter, abbreviated as "EC"), and ethyl methyl carbonate (hereinafter, abbreviated as "EMC") were mixed with one another at a volume ratio of 1:1:6 to form a nonaqueous solvent.

$LiPF_6$ was dissolved in the nonaqueous solvent at a concentration of 1.0 mol/liter. Hereby, a nonaqueous electrolyte solution was prepared.

A separator was impregnated with the nonaqueous electrolyte solution. The separator was a product of Celgard (Product number: 2320, thickness: 25 micrometers). The separator was a three-layer separator constituted by a polypropylene layer, a polyethylene layer, and a polypropylene layer.

A coin-shaped battery having a diameter of 20 mm and a thickness of 3.2 mm was prepared using the positive electrode, the negative electrode, and the separator in a dry box in which the dew point was kept at −50 degrees Celsius.

Example 2

In Example 2, a positive electrode active material and a coin-shaped battery including the positive electrode active material were prepared as in Example 1, except the item (i) below.
(i) the concentration of $Mn(CH_3COO)_2 \cdot 4H_2O$ in the coating solution was not 0.1 mol/L but 0.05 mol/L.

Example 3

In Example 3, a positive electrode active material and a coin-shaped battery including the positive electrode active material were prepared as in Example 1, except the item (ii) below.
(ii) the amount of time during which the precursor of the second lithium composite oxide was subjected to a heat treatment was not 5 hours but 1 hour.

Example 4

In Example 4, a positive electrode active material and a coin-shaped battery including the positive electrode active material were prepared as in Example 1, except the items (i) and (ii) below.
(i) the concentration of $Mn(CH_3COO)_2 \cdot 4H_2O$ in the coating solution was not 0.1 mol/L but 0.05 mol/L.

(ii) the amount of time during which the precursor of the second lithium composite oxide was subjected to a heat treatment was not 5 hours but 1 hour.

Comparative Example 1

In Comparative example 1, a positive electrode active material and a coin-shaped battery including the positive electrode active material were prepared as in Example 1, except that the surface of the first lithium composite oxide was not covered with the second lithium composite oxide. In other words, the positive electrode active material prepared in Comparative example 1 was constituted by only the first lithium composite oxide.

Comparative Examples 2 to 9

In Comparative examples 2 to 9, a positive electrode active material and a coin-shaped battery including the positive electrode active material were prepared as in Example 1, except that at least one selected from the group consisting of the items (i) to (iii) below was changed. For details of the changes, refer to Tables 1 to 3.
(i) the concentration of $Mn(CH_3COO)_2 \cdot 4H_2O$ in the coating solution
(ii) the temperature at which the precursor of the second lithium composite oxide was subjected to a heat treatment, and
(iii) the amount of time during which the precursor of the second lithium composite oxide was subjected to a heat treatment Battery Evaluations The battery prepared in Example 1 was charged to a voltage of 4.7 volts at a current density of 0.5 mA/cm².

Subsequently, the battery prepared in Example 1 was discharged to a voltage of 2.5 volts at a current density of 0.5 mA/cm².

The initial discharge capacity of the battery prepared in Example 1 was 262 mAh/g.

The average operating voltage of the battery prepared in Example 1 during discharging was calculated. The average operating voltage (i.e., the average operating voltage during the initial discharging) was 3.41 volts.

Then, the battery prepared in Example 1 was again charged to a voltage of 4.7 volts at a current density of 0.5 mA/cm².

Subsequently, the battery prepared in Example 1 was again discharged to a voltage of 2.5 volts at a current density of 0.5 mA/cm².

The above-described charge-discharge cycle was repeated 19 times (i.e., 19 cycles). The drop in the average operating voltage of the battery prepared in Example 1 per charge-discharge cycle was calculated. The drop in average operating voltage was −1.1 millivolts.

The initial discharge capacity of each of the batteries prepared in Examples 2 to 4 and Comparative examples 1 to 9, the average operating voltage of the battery during the initial discharging, and the drop in the average operating voltage of the battery per charge-discharge cycle were measured as described above.

Figure 4:
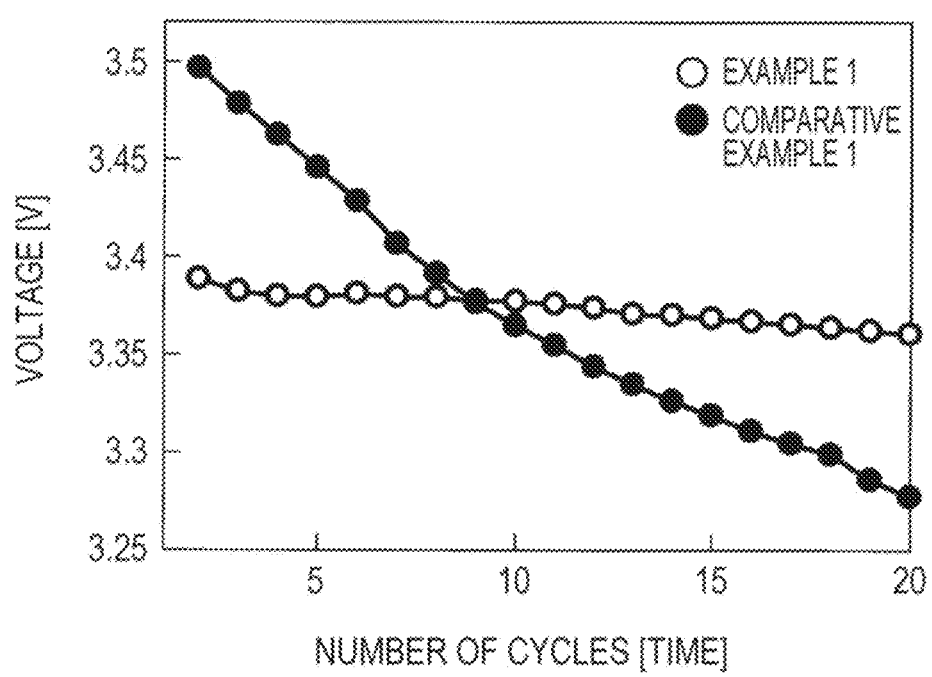
FIG. 4 is a graph illustrating changes in the average operating voltages of the batteries prepared in Example 1 and Comparative example 1 which occurred when the batteries were repeatedly charged and discharged.

Tables 1 to 3 describe the results. FIG. 4 is a graph illustrating changes in the average operating voltages of the batteries prepared in Example 1 and Comparative example 1 which occurred when the batteries were repeatedly charged and discharged.

TABLE 1

| | Positive electrode active material | | | | |
|---|---|---|---|---|---|
| | First lithium composite oxide | | Second lithium composite oxide (spinel surface layer) Formation | Integrated intensity ratio $I_{(18°-20°)}/I_{(43°-46°)}$ | Integrated intensity ratio $I_{(63°-65°)}/I_{(65°-66°)}$ |
| | Composition | Space group | | | |
| Example 1 | $Li_{1.2}Mn_{0.54}Co_{0.13}Ni_{0.13}O_{1.9}F_{0.1}$ | C2/m | Yes | 0.56 | 1.28 |
| Example 2 | $Li_{1.2}Mn_{0.54}Co_{0.13}Ni_{0.13}O_{1.9}F_{0.1}$ | C2/m | Yes | 0.59 | 1.22 |
| Example 3 | $Li_{1.2}Mn_{0.54}Co_{0.13}Ni_{0.13}O_{1.9}F_{0.1}$ | C2/m | Yes | 0.55 | 1.23 |
| Example 4 | $Li_{1.2}Mn_{0.54}Co_{0.13}Ni_{0.13}O_{1.9}F_{0.1}$ | C2/m | Yes | 0.57 | 1.22 |
| Comparative example 1 | $Li_{1.2}Mn_{0.54}Co_{0.13}Ni_{0.13}O_{1.9}F_{0.1}$ | C2/m | No | 0.87 | 0.95 |
| Comparative example 2 | $Li_{1.2}Mn_{0.54}Co_{0.13}Ni_{0.13}O_{1.9}F_{0.1}$ | C2/m | No | 0.89 | 1.03 |
| Comparative example 3 | $Li_{1.2}Mn_{0.54}Co_{0.13}Ni_{0.13}O_{1.9}F_{0.1}$ | C2/m | No | 0.87 | 1.05 |
| Comparative example 4 | $Li_{1.2}Mn_{0.54}Co_{0.13}Ni_{0.13}O_{1.9}F_{0.1}$ | C2/m | No | 0.88 | 1.04 |
| Comparative example 5 | $Li_{1.2}Mn_{0.54}Co_{0.13}Ni_{0.13}O_{1.9}F_{0.1}$ | C2/m | No | 0.89 | 1.02 |
| Comparative example 6 | $Li_{1.2}Mn_{0.54}Co_{0.13}Ni_{0.13}O_{1.9}F_{0.1}$ | C2/m | No | 0.76 | 1.06 |
| Comparative example 7 | $Li_{1.2}Mn_{0.54}Co_{0.13}Ni_{0.13}O_{1.9}F_{0.1}$ | C2/m | No | 0.77 | 1.06 |
| Comparative example 8 | $Li_{1.2}Mn_{0.54}Co_{0.13}Ni_{0.13}O_{1.9}F_{0.1}$ | C2/m | No | 0.64 | 1.09 |
| Comparative example 9 | $Li_{1.2}Mn_{0.54}Co_{0.13}Ni_{0.13}O_{1.9}F_{0.1}$ | C2/m | No | 0.71 | 1.17 |

TABLE 2

|   | Initial discharge capacity (mAh/g) | Average operating voltage drop (mV/cycle) |
|---|---|---|
| Example 1 | 262 | 1.1 |
| Example 2 | 269 | 2.4 |
| Example 3 | 263 | 2.6 |
| Example 4 | 269 | 2.6 |
| Comparative example 1 | 274 | 5.5 |
| Comparative example 2 | 274 | 5.5 |
| Comparative example 3 | 274 | 5.5 |
| Comparative example 4 | 276 | 5.7 |
| Comparative example 5 | 279 | 5.9 |
| Comparative example 6 | 274 | 5.1 |
| Comparative example 7 | 273 | 4.9 |
| Comparative example 8 | 272 | 5.6 |
| Comparative example 9 | 273 | 5.4 |

TABLE 3

| | Second lithium composite oxide (spinel surface layer) | | | | | | |
|---|---|---|---|---|---|---|---|
| | Formation conditions | | | | | | |
| | Concentration of $Mn(CH_3CO_2)_2 \cdot 4H_2O$ (mol/L) | Heating temperature (Celsius) | Heating time (hour) | Formation | Thickness (nm) | Molar ratio (%) | Composition |
| Example 1 | 0.1 | 750 | 5 | Yes | 6 | 29 | $LiMn_2O_4$ |
| Example 2 | 0.05 | 750 | 5 | Yes | 1.5 | 12 | $LiMn_2O_4$ |
| Example 3 | 0.1 | 750 | 1 | Yes | 6 | 29 | $LiMn_2O_4$ |
| Example 4 | 0.05 | 750 | 1 | Yes | 0.5 | 6 | $LiMn_2O_4$ |
| Comparative example 1 | — | — | — | No | — | — | — |
| Comparative example 2 | 0.001 | 500 | 1 | No | — | — | — |
| Comparative example 3 | 0.001 | 500 | 5 | No | — | — | — |
| Comparative example 4 | 0.001 | 750 | 1 | No | — | — | — |
| Comparative example 5 | 0.001 | 750 | 5 | No | — | — | — |
| Comparative example 6 | 0.05 | 500 | 1 | No | — | — | — |
| Comparative example 7 | 0.05 | 500 | 5 | No | — | — | — |
| Comparative example 8 | 0.1 | 500 | 1 | No | — | — | — |
| Comparative example 9 | 0.1 | 500 | 5 | No | — | — | — |

As described in Tables 1 to 3, in the batteries prepared in Examples 1 to 4, the average operating voltage was reduced by 1.1 to 2.6 millivolts per charge-discharge cycle. In contrast, in the batteries prepared in Comparative examples 1 to 9, the average operating voltage was reduced by 4.9 to 5.9 millivolts per charge-discharge cycle. The drops in the average operating voltages of the batteries prepared in Examples 1 to 4 were limited compared with the batteries prepared in Comparative examples 1 to 9.

This is presumably because the positive electrode active materials prepared in Examples 1 to 4 had a crystal structure belonging to the space group Fd-3m (i.e., a spinel crystal structure). It was confirmed that the integrated intensity ratios $I_{(63°-65°)}/I_{(65°-66°)}$ of the positive electrode active materials prepared in Examples 1 to 4 which were determined from X-ray diffraction patterns were greater than or equal to 1.18 and less than or equal to 2.0 and a crystal structure belonging to the space group Fd-3m (spinel crystal structure) was present in the surfaces of the positive electrode active materials prepared in Examples 1 to 4. The results of TEM observation also confirm the above fact. In a crystal structure belonging to the space group Fd-3m (i.e., a spinel crystal structure), transition metal-anion octahedrons, which serve as pillars, form a three-dimensional network. This presumably enhanced the stability of crystal structure during charging and discharging and limited the drop in average operating voltage.

The drop in the average operating voltage of the battery prepared in Example 1 was further limited compared with the battery prepared in Example 3. This is presumably because, in Example 1, the amount of time during which heating was performed in the heat treatment for the preparation of the second lithium composite oxide was larger than in Example 3 and, accordingly, a crystal structure belonging to the space group Fd-3m (i.e., a spinel crystal structure) was formed at a higher density than in Example 3.

It was confirmed that, compared with the battery prepared in Comparative example 1, the initial discharge capacities of the batteries prepared in Examples 1 to 4 were slightly reduced due to the formation of a crystal structure belonging to the space group Fd-3m (i.e., a spinel crystal structure). It is considered that, in a crystal structure belonging to the space group Fd-3m (i.e., a spinel crystal structure), transition metal-anion octahedrons, which serve as pillars, form a three-dimensional network, which may enhance the stability of crystal structure. On the other hand, in a crystal structure belonging to the space group C2/m (i.e., a layered structure), transition metal-anion octahedrons, which serve as pillars, form a two-dimensional network. During charging and discharging, lithium ions included in the layered structure diffuse more smoothly than lithium ions included in a spinel crystal structure. This presumably slightly reduced the initial discharge capacities of the batteries prepared in Examples 1 to 4. However, the reductions in initial discharge capacity were negligible because a crystal structure belonging to the space group Fd-3m (i.e., a spinel crystal structure) was formed on only the surfaces of the positive electrode active materials prepared in Examples 1 to 4. Thus, the batteries prepared in Examples 1 to 4 had a large capacity.

The reduction in the drop in the average operating voltage of the battery prepared in Example 1 was greater than any of the reductions in the drops in the average operating voltages of the batteries prepared in Examples 2 and 4. This is presumably because, in Example 1, the concentration of $Mn(CH_3COO)_2 \cdot 4H_2O$ in the coating solution was higher and, accordingly, a crystal structure belonging to the space group Fd-3m (i.e., a spinel crystal structure) was formed at a higher density.

Although the batteries of Comparative examples 2 to 9 were prepared as in Examples 1 to 4 using the aqueous solution of $Mn(CH_3COO)_2 \cdot 4H_2O$, the batteries prepared in Comparative examples 2 to 9 had an initial discharge capacity and an average operating voltage drop that were substantially equal to those measured in Comparative example 1. This is presumably because the integrated intensity ratios $I_{(63°-65°)}/I_{(65°-66°)}$ of the positive electrode active materials prepared in Comparative examples 2 to 9 which were determined from X-ray diffraction patterns did not fall within the range of greater than or equal to 1.13 and less than or equal to 2.0 and a crystal structure belonging to the space group Fd-3m (i.e., a spinel crystal structure) was not formed. It is considered that the batteries prepared in Comparative examples 2 to 9 had properties similar to those of the battery prepared in Comparative example 1 for the above reasons. One of the possible reasons why a spinel crystal structure was not formed on the surface although a process similar to that conducted in Example 1 was conducted is that the heat treatment temperature was low. Commonly, a crystal structure belonging to the space group Fd-3m (i.e., a spinel crystal structure) is prepared at 700° C. or more. Therefore, it is considered that, in Comparative examples 2 to 9, a crystal structure belonging to the space group Fd-3m was not formed on the surface of the lithium composite oxide due to the heat treatment conditions. If is considered the initial discharge capacity did not change in Comparative examples 2 to 9 (i.e., the batteries prepared in Comparative examples 2 to 9 had initial discharge capacities substantially equal to the initial discharge capacity of the battery prepared in Comparative example 1) since dislocations were not present in the crystal structure.

Reference examples are described below. The positive electrode active materials used in Reference examples below included the first lithium composite oxide but did not include the second lithium composite oxide.

Reference Example 1

A mixture of LiF, $Li_2MnO_3$, $LiMnO_1$, $LiCoO_2$, and $LiNiO_2$ was prepared such that the mixture had a Li/Mn/Co/Ni/O/F molar ratio of 1.2/0.54/0.13/0.13/1.9/0.1.

The mixture and an appropriate amount of zirconia balls having a diameter of 3 mm were charged info a container having a volume of 45 milliliters. The container was hermetically sealed in an argon glove box. The container was made of zirconia.

Subsequently, the container was removed from the argon glove box. The mixture contained in the container was subjected to a planetary ball mill at 600 rpm for 30 hours in an argon atmosphere to form a precursor.

The precursor was subjected to a powder X-ray diffraction measurement.

The results of the measurement confirmed that the space group of the precursor was Fm-3m.

The above precursor was subjected to a heat treatment at 700° C. for 1 hour in an air atmosphere. Hereby, a positive electrode active material of Reference example 1 was prepared.

The positive electrode active material prepared in Reference example 1 was subjected to a powder X-ray diffraction measurement.

The results of the measurement confirmed that the space group of the positive electrode active material prepared in Reference example 1 was C2/m.

The positive electrode active material prepared in Reference example 1 had an integrated intensify ratio $I_{(18°-20°)}/I_{(43°-46°)}$ of 0.80.

A coin-shaped battery of Reference example 1 was prepared as in Example 1 using the positive electrode active material prepared in Reference example 1.

Reference Examples 2 to 26

In Reference examples 2 to 26, a positive electrode active material and a coin-shaped battery including the positive electrode active material were prepared as in Example 1, except the items (i) and (ii) below.
  (i) the conditions under which the precursor was prepared and the mixing ratio of Li/Me/O/F were changed.
  (ii) the conditions under which the heating was performed were changed within the ranges of 600° C. to 900° C. and 30 minutes to 1 hour.

For further details, refer to Tables 4 to 7.

The space groups of the positive electrode active materials prepared in Reference examples 2 to 26 were identified as C2/m.

Each of the precursors used in Reference examples 2 to 26 was prepared by weighing the raw materials on the basis of the stoichiometric ratio as in Reference example 1 and mixing the raw materials with one another.

For example, in Reference example 13, LiF, $Li_2MnO_3$, $LiMnO_1$, $LiCoO_2$, $LiNiO_2$, and MgO were weighed such that a Li/Mn/Co/Ni/Mg/O/F molar ratio of 1.2/0.49/0.13/0.13/0.05/1.9/0.1 was achieved and then mixed with one another.

Reference Example 27

In Reference example 27, a positive electrode active material having a composition represented by $Li_{1.2}Mn_{0.54}Co_{0.13}Ni_{0.13}O_{1.9}F_{0.1}$ was prepared as in Reference example 1.

In Reference example 27, the heat treatment was performed at 700° C. for 3 hours.

The positive electrode active material prepared in Reference example 27 was subjected to a powder X-ray diffraction measurement.

The results of the measurement confirmed that the space group of the positive electrode active material prepared in Reference example 27 was C2/m.

The positive electrode active material prepared in Reference example 27 had an integrated intensity ratio $I_{(18°-20°)}/I_{(43°-46°)}$ of 1.03.

In Reference example 27, a coin-shaped battery was also prepared as in Reference example 1.

Reference Example 28

In Reference example 28, a positive electrode active material having a composition represented by $Li_{1.2}Mn_{0.54}Co_{0.13}Ni_{0.13}O_{1.9}F_{0.1}$ was prepared as in Reference example 1.

In Reference example 28, the heat treatment was performed at 300° C. for 10 minutes.

The positive electrode active material prepared in Reference example 28 was subjected to a powder X-ray diffraction measurement.

The results of the measurement confirmed that the space group of the positive electrode active material prepared in Reference example 28 was C2/m.

The positive electrode active material prepared in Reference example 28 had an integrated intensity ratio $I_{(18°-20°)}/I_{(43°-46°)}$ of 0.02.

In Reference example 28, a coin-shaped battery was also prepared as in Reference example 1.

Reference Example 29

In Reference example 29, a positive electrode active material having a composition represented by $Li_{1.2}Mn_{0.54}Co_{0.13}Ni_{0.13}O_{2.0}$ was prepared as in Reference example 1.

In Reference example 29, LiF was not used as a raw material.

The positive electrode active material prepared in Reference example 29 was subjected to a powder X-ray diffraction measurement.

The results of the measurement confirmed that the space group of the positive electrode active material prepared in Reference example 29 was C2/m.

The positive electrode active material prepared in Reference example 29 had an integrated intensity ratio $I_{(18°-20°)}/I_{(43°-46°)}$ of 0.82.

In Reference example 29, a coin-shaped battery was also prepared as in Reference example 1.

Reference Example 30

In Reference example 30, a positive electrode active material having a composition represented by $Li_{1.2}Mn_{0.54}Co_{0.13}Ni_{0.13}O_{1.9}F_{0.1}$ was prepared as in Reference example 1.

In Reference example 30, a heat treatment was not performed subsequent to the treatment using a ball mill.

The positive electrode active material prepared in Reference example 30 was subjected to a powder X-ray diffraction measurement.

The results of the measurement confirmed that the space group of the positive electrode active material was Fm-3m.

In Reference example 30, a coin-shaped battery was also prepared as in Reference example 1.

Reference Example 31

In Reference example 31, a positive electrode active material having a composition represented by $LiCoO_2$ was prepared by a known method.

The positive electrode active material prepared in Reference example 31 was subjected to a powder X-ray diffraction measurement.

The results of the measurement confirmed that the space group of the positive electrode active material prepared in Reference example 31 was R-3m.

In Reference example 31, a coin-shaped battery was also prepared as in Reference example 1.

Battery Evaluations

The battery prepared in Reference example 1 was charged to a voltage of 4.9 volts at a current density of 0.5 mA/cm².

Subsequently, the battery prepared in Reference example 1 was discharged to a voltage of 2.5 volts at a current density of 0.5 mA/cm².

The initial discharge capacity of the battery prepared in Reference example 1 was 299 mAh/g.

The battery prepared in Reference example 27 was charged to a voltage of 4.3 volts at a current density of 0.5 mA/cm².

Subsequently, the battery prepared in Reference example 27 was discharged to a voltage of 2.5 volts at a current density of 0.5 mA/cm².

The initial discharge capacity of the battery prepared in Reference example 27 was 236 mAh/g.

The initial discharge capacities of the coin-shaped batteries prepared in Reference examples 2 to 26 and Reference examples 28 to 31 were measured as described above.

Tables 4 to 7 describe the results.

TABLE 4

| | Composition | x/y | α/β | (x + y)/(α + β) |
|---|---|---|---|---|
| Reference example 1 | $Li_{1.2}Mn_{0.54}Co_{0.13}Ni_{0.13}O_{1.9}F_{0.1}$ | 1.5 | 19 | 1.0 |
| Reference example 2 | $Li_{1.2}Mn_{0.54}Co_{0.13}Ni_{0.13}O_{1.9}F_{0.1}$ | 1.5 | 19 | 1.0 |
| Reference example 3 | $Li_{1.2}Mn_{0.54}Co_{0.13}Ni_{0.13}O_{1.9}F_{0.1}$ | 1.5 | 19 | 1.0 |
| Reference example 4 | $Li_{1.2}Mn_{0.54}Co_{0.13}Ni_{0.13}O_{1.9}F_{0.1}$ | 1.5 | 19 | 1.0 |
| Reference example 5 | $Li_{1.2}Mn_{0.54}Co_{0.13}Ni_{0.13}O_{1.95}F_{0.05}$ | 1.5 | 39 | 1.0 |
| Reference example 6 | $Li_{1.2}Mn_{0.54}Co_{0.13}Ni_{0.13}O_{1.8}F_{0.2}$ | 1.5 | 9 | 1.0 |
| Reference example 7 | $Li_{1.2}Mn_{0.8}O_{1.9}F_{0.1}$ | 1.5 | 19 | 1.0 |
| Reference example 8 | $Li_{1.2}Mn_{0.6}Co_{0.2}O_{1.9}F_{0.1}$ | 1.5 | 19 | 1.0 |
| Reference example 9 | $Li_{1.2}Mn_{0.54}Ni_{0.2}O_{1.9}F_{0.1}$ | 1.5 | 19 | 1.0 |
| Reference example 10 | $Li_{1.25}Mn_{0.51}Co_{0.12}Ni_{0.12}O_{1.9}F_{0.1}$ | 1.7 | 19 | 1.0 |
| Reference example 11 | $Li_{1.3}Mn_{0.5}Co_{0.1}Ni_{0.1}O_{1.9}F_{0.1}$ | 1.9 | 19 | 1.0 |
| Reference example 12 | $Li_{1.15}Mn_{0.57}Co_{0.14}Ni_{0.14}O_{1.9}F_{0.1}$ | 1.3 | 19 | 1.0 |

TABLE 4-continued

|  | Composition | x/y | α/β | (x + y)/(α + β) |
|---|---|---|---|---|
| Reference example 13 | $Li_{1.2}Mn_{0.49}Co_{0.13}Ni_{0.13}Mg_{0.13}O_{1.9}F_{0.1}$ | 1.5 | 19 | 1.0 |
| Reference example 14 | $Li_{1.2}Mn_{0.49}Co_{0.13}Ni_{0.13}B_{0.13}O_{1.9}F_{0.1}$ | 1.5 | 19 | 1.0 |

TABLE 5

|  | Space group | Integrated intensity ratio $I_{(18°-20°)}/I_{(43°-46°)}$ | Initial discharge capacity (mAh/g) |
|---|---|---|---|
| Reference example 1 | C2/m | 0.80 | 299 |
| Reference example 2 | C2/m | 0.62 | 289 |
| Reference example 3 | C2/m | 0.11 | 282 |
| Reference example 4 | C2/m | 0.85 | 274 |
| Reference example 5 | C2/m | 0.78 | 294 |
| Reference example 6 | C2/m | 0.83 | 269 |
| Reference example 7 | C2/m | 0.65 | 281 |
| Reference example 8 | C2/m | 0.44 | 276 |
| Reference example 9 | C2/m | 0.69 | 274 |
| Reference example 10 | C2/m | 0.70 | 271 |
| Reference example 11 | C2/m | 0.53 | 266 |
| Reference example 12 | C2/m | 0.61 | 269 |
| Reference example 13 | C2/m | 0.79 | 295 |
| Reference example 14 | C2/m | 0.77 | 298 |

TABLE 6

|  | Composition | x/y | α/β | (x + y)/(α + β) |
|---|---|---|---|---|
| Reference example 15 | $Li_{1.2}Mn_{0.49}Co_{0.13}Ni_{0.13}P_{0.13}O_{1.9}F_{0.1}$ | 1.5 | 19 | 1.0 |
| Reference example 16 | $Li_{1.2}Mn_{0.49}Co_{0.13}Ni_{0.13}Al_{0.13}O_{1.9}F_{0.1}$ | 1.5 | 19 | 1.0 |
| Reference example 17 | $Li_{1.2}Mn_{0.49}Co_{0.13}Ni_{0.13}Ti_{0.13}O_{1.9}F_{0.1}$ | 1.5 | 19 | 1.0 |
| Reference example 18 | $Li_{1.2}Mn_{0.49}Co_{0.13}Ni_{0.13}Nb_{0.13}O_{1.9}F_{0.1}$ | 1.5 | 19 | 1.0 |
| Reference example 19 | $Li_{1.2}Mn_{0.49}Co_{0.13}Ni_{0.13}W_{0.13}O_{1.9}F_{0.1}$ | 1.5 | 19 | 1.0 |
| Reference example 20 | $Li_{1.2}Mn_{0.49}Co_{0.13}Ni_{0.13}V_{0.13}O_{1.9}F_{0.1}$ | 1.5 | 19 | 1.0 |
| Reference example 21 | $Li_{1.2}Mn_{0.49}Co_{0.13}Ni_{0.13}Cr_{0.13}O_{1.9}F_{0.1}$ | 1.5 | 19 | 1.0 |
| Reference example 22 | $Li_{1.2}Mn_{0.49}Co_{0.13}Ni_{0.13}Si_{0.13}O_{1.9}F_{0.1}$ | 1.5 | 19 | 1.0 |
| Reference example 23 | $Li_{1.2}Mn_{0.49}Co_{0.13}Ni_{0.13}Fe_{0.13}O_{1.9}F_{0.1}$ | 1.5 | 19 | 1.0 |
| Reference example 24 | $Li_{1.2}Mn_{0.49}Co_{0.13}Ni_{0.13}Cu_{0.13}O_{1.9}F_{0.1}$ | 1.5 | 19 | 1.0 |
| Reference example 25 | $Li_{1.2}Mn_{0.49}Co_{0.13}Ni_{0.13}Ru_{0.13}O_{1.9}F_{0.1}$ | 1.5 | 19 | 1.0 |
| Reference example 26 | $Li_{1.2}Mn_{0.49}Co_{0.13}Ni_{0.13}Na_{0.13}O_{1.9}F_{0.1}$ | 1.5 | 19 | 1.0 |
| Reference example 27 | $Li_{1.2}Mn_{0.54}Co_{0.13}Ni_{0.13}O_{1.9}F_{0.1}$ | 1.5 | 19 | 1.0 |

TABLE 7

| | Space group | Integrated intensity ratio $I_{(18°\text{-}20°)}/I_{(43°\text{-}46°)}$ | Initial discharge capacity (mAh/g) |
|---|---|---|---|
| Reference example 15 | C2/m | 0.79 | 292 |
| Reference example 16 | C2/m | 0.80 | 290 |
| Reference example 17 | C2/m | 0.80 | 285 |
| Reference example 18 | C2/m | 0.76 | 283 |
| Reference example 19 | C2/m | 0.74 | 283 |
| Reference example 20 | C2/m | 0.81 | 291 |
| Reference example 21 | C2/m | 0.80 | 294 |
| Reference example 22 | C2/m | 0.82 | 286 |
| Reference example 23 | C2/m | 0.75 | 285 |
| Reference example 24 | C2/m | 0.77 | 288 |
| Reference example 25 | C2/m | 0.76 | 285 |
| Reference example 26 | C2/m | 0.77 | 285 |
| Reference example 27 | C2/m | 1.03 | 236 |

As described in Tables 4 to 7, the batteries prepared in Reference examples 1 to 26 had an initial discharge capacity of 266 to 299 mAh/g.

In other words, the batteries prepared in Reference examples 1 to 26 had a larger initial discharge capacity than the batteries prepared in Reference examples 27 to 31.

This is presumably because the lithium composite oxides included in the positive electrode active materials of the batteries prepared in Reference examples 1 to 26 included F and had a crystal structure belonging to the space group C2/m and the integrated intensity ratios $I_{(18°\text{-}20°)}/I_{(43°\text{-}46°)}$ of the lithium composite oxides which were determined from X-ray diffraction patterns were greater than or equal to 0.05 and less than or equal to 0.90. That is, replacing some of the oxygen atoms with F atoms, which have high electronegativity, enhanced the stability of crystal structure. In addition, since the integrated intensity ratios $I_{(18°\text{-}20°)}/I_{(43°\text{-}46°)}$ were greater than or equal to 0.05 and less than or equal to 0.90, cation mixing between Li and Me occurred to a sufficient degree. This presumably increased the amount of Li atoms adjacent to one another and enhanced the diffusibility of Li. It is considered that the comprehensive action of the above advantageous effects markedly increased the initial discharge capacities.

It is considered that, in Reference example 27, where the integrated intensity ratio $I_{(18°\text{-}20°)}/I_{(43°\text{-}46°)}$ was higher than 0.90, cation mixing was suppressed and the number of three-dimensional lithium diffusion channels was reduced consequently. This presumably blocked the diffusion of lithium and resulted in the reduction in initial discharge capacity.

It is considered that, in Reference example 28, where the integrated intensity ratio $I_{(18°\text{-}20°)}/I_{(43°\text{-}46°)}$ was lower than 0.05, the crystal structure became thermodynamically unstable and collapsed upon the deintercalation of Li during charging. This presumably resulted in the reduction in initial discharge capacity.

It is considered that, in Reference example 29, where the lithium composite oxide did not include F, the crystal structure became unstable and collapsed upon the deintercalation of Li during charging. This presumably resulted in the reduction in initial discharge capacity.

As described in Tables 4 and 5, the battery prepared in Reference example 2 had a smaller initial discharge capacity than the battery prepared in Reference example 1.

This is presumably because the battery prepared in Reference example 2 had a lower integrated intensity ratio $I_{(18°\text{-}20°)}/I_{(43°\text{-}46°)}$ than the battery prepared in Reference example 1. This presumably degraded the stability of crystal structure and resulted in the reduction in initial discharge capacity.

As described in Tables 4 and 5, the battery prepared in Reference example 3 had a smaller initial discharge capacity than the battery prepared in Reference example 2.

This is presumably because the battery prepared in Reference example 3 had a lower integrated intensity ratio $I_{(18°\text{-}20°)}/I_{(43°\text{-}46°)}$ than the battery prepared in Reference example 2. This presumably degraded the stability of crystal structure and resulted in the reduction in initial discharge capacity.

As described in Tables 4 and 5, the battery prepared in Reference example 4 had a smaller initial discharge capacity than the battery prepared in Reference example 1.

This is presumably because the battery prepared in Reference example 4 had a higher integrated intensity ratio $I_{(18°\text{-}20°)}/I_{(43°\text{-}46°)}$ than the battery prepared in Reference example 1. It is considered that this suppressed cation mixing and slightly reduced the number of three-dimensional lithium diffusion channels consequently. This presumably blocked the diffusion of lithium and resulted in the reduction in initial discharge capacity.

As described in Tables 4 and 5, the battery prepared in Reference example 5 had a smaller initial discharge capacity than the battery prepared in Reference example 1.

This is presumably because the battery prepared in Reference example 5 had a higher (α/β) ratio than the battery prepared in Reference example 1. That is, a capacity due to the oxidation and reduction of oxygen was excessively large. Furthermore, the impact of F, which has high electronegativity, was small. Therefore, it is considered that the crystal structure became unstable upon the deintercalation of Li. This presumably reduced the initial discharge capacity.

As described in Tables 4 and 5, the battery prepared in Reference example 6 had a smaller initial discharge capacity than the battery prepared in Reference example 1.

This is presumably because the battery prepared in Reference example 6 had a lower (α/β) ratio than the battery prepared in Reference example 1. That is, the amount of charge compensation due to the oxidation and reduction of oxygen was reduced. Furthermore, the impact of F, which has high electronegativity, was large. Therefore, it is considered that electron conductivity was reduced. This presumably reduced the initial discharge capacity.

As described in Tables 4 and 5, the batteries prepared in Reference examples 7 to 9 had a smaller initial discharge capacity than the battery prepared in Reference example 1.

This is presumably because the batteries prepared in Reference examples 7 to 9 did not include at least one selected from the group consisting of Co and Ni, which stabilize the crystal structure and facilitate the deintercalation of Li, respectively, unlike the battery prepared in Reference example 1. This presumably reduced the initial discharge capacity.

As described in Tables 4 and 5, the battery prepared in Reference example 10 had a smaller initial discharge capacity than the battery prepared in Reference example 1.

This is presumably because the battery prepared in Reference example 10 had a higher (x/y) ratio than the battery prepared in Reference example 1. Thus, a large amount of Li included in the crystal structure was deintercalated during the initial charging of the battery. This presumably degraded the stability of crystal structure. Furthermore, the destabilization of crystal structure resulted in a reduction in the amount of Li intercalated during discharging. This presumably resulted in the reduction in initial discharge capacity.

As described in Tables 4 and 5, the battery prepared in Reference example 11 had a smaller initial discharge capacity than the battery prepared in Reference example 1.

This is presumably because the battery prepared in Reference example 11 had a higher (x/y) ratio than the battery prepared in Reference example 10. Thus, a large amount of Li included in the crystal structure was deintercalated during the initial charging of the battery. This presumably degraded the stability of crystal structure. Furthermore, the destabilization of crystal structure resulted in a reduction in the amount of Li intercalated during discharging. This presumably resulted in the reduction in initial discharge capacity.

As described in Tables 4 and 5, the battery prepared in Reference example 12 had a smaller initial discharge capacity than the battery prepared in Reference example 1.

This is presumably because the battery prepared in Reference example 12 had a lower (x/y) ratio than the battery prepared in Reference example 10. It is considered that this reduced the amount of Li responsible for the reaction and degraded the diffusibility of Li ions. This presumably reduced the initial discharge capacity.

As described in Tables 4 to 7, the batteries prepared in Reference examples 13 to 26 had a smaller initial discharge capacity than the battery prepared in Reference example 1.

This is presumably because the batteries prepared in Reference examples 13 to 26 included a lower content of Mn, which is capable of readily combining with oxygen to form a hybrid orbital, than the battery prepared in Reference example 1. This presumably slightly reduced the contribution of oxygen to the oxidation reduction reaction and resulted in the reduction in initial discharge capacity.

The positive electrode active material according to an embodiment of the present disclosure may be used as a positive electrode active material used for producing a battery, such as secondary battery.

What is claimed is:

1. A positive electrode active material comprising:
   a first lithium composite oxide; and
   a second lithium composite oxide that covers at least a part of a surface of the first lithium composite oxide, wherein:
   the first lithium composite oxide includes at least one selected from the group consisting of F, Cl, N, and S,
   the first lithium composite oxide has a crystal structure belonging to a layered structure,
   the second lithium composite oxide has a crystal structure belonging to space group Fd-3m, and
   the following mathematical formula (I) is satisfied:

$0.05 \leq$ Integrated intensity ratio) $I_{(18°-20°)}/I_{(43°-46°)} \leq 0.90$ (I), where the integrated intensity ratio) $I_{(18°-20°)}/I_{(43°-46°)}$ is a ratio of an integrated intensity) $I_{(18°-20°)}$ to an integrated intensity) $I_{(43°-46°)}$,
   the integrated intensity) $I_{(18°-20°)}$ is an integrated intensity of a first peak that is a maximum peak present in a range of angle of diffraction 2θ greater than or equal to 18° and less than or equal to 20° in an X-ray diffraction pattern of the positive electrode active material,
   the integrated intensity) $I_{(43°-46°)}$ is an integrated intensity of a second peak that is a maximum peak present in a range of angle of diffraction 2θ greater than or equal to 43° and less than or equal to 46° in the X-ray diffraction pattern of the positive electrode active material,
   the second lithium composite oxide is represented by composition formula $Li_a A_b O_c$,
   the second lithium composite oxide has a thickness of greater than or equal to 0.1 nanometers and less than or equal to 30 nanometers.
   where
   A is at least one element selected from the group consisting of Ni, Co, Mn, Si, Al, P, S, Ti, V, Cr, Fe, Cu, Zn, Ga, Zr, Nb, Mo, Ru, Ta, and W, $0 < a \leq 2$, $1.8 \leq b \leq 2.2$, and $3.5 \leq c \leq 4.5$, and the first lithium composite oxide is represented by composition formula $Li_x Me_y O_\alpha Q_\beta$,
   where
   Me is at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al,
   Q is at least one selected from the group consisting of F, Cl, N, and S, $1.05 \leq x \leq 1.4$, $0.6 \leq y \leq 0.95$, $1.33 \leq \alpha < 2$, and $0.1 \leq \beta \leq 0.67$.

2. The positive electrode active material according to claim 1,
   wherein the integrated intensity ratio)) $I_{(18°-20°)}/I_{(43°-46°)}$ is greater than or equal to 0.11 and less than or equal to 0.85.

3. The positive electrode active material according to claim 2,
   wherein the integrated intensity ratio)) $I_{(18°-20°)}/I_{(43°-46°)}$ is greater than or equal to 0.44 and less than or equal to 0.85.

4. The positive electrode active material according to claim 3,
   wherein the integrated intensity ratio)) $I_{(18°-20°)}/I_{(43°-46°)}$ is greater than or equal to 0.55 and less than or equal to 0.59.

5. The positive electrode active material according to claim 1,
   wherein the crystal structure of the first lithium composite oxide belongs to at least one selected from the group consisting of space group C2/m and space group R-3m.

6. The positive electrode active material according to claim 5,
   wherein the crystal structure of the first lithium composite oxide belongs to space group C2/m.

7. The positive electrode active material according to claim 1, wherein the X-ray diffraction pattern has two or more peaks in a range of diffraction angle 2θ of greater than or equal to 63° and less than or equal to 66°.

8. The positive electrode active material according to claim 7, wherein the following mathematical formula (II) is satisfied:

$1.18 \leq$ Integrated intensity ratio $I_{(63°-65°)}/I_{(65°-66°)} \leq 2.0$ (II), where the integrated intensity ratio $I_{(63°-65°)}/I_{(65°-66°)}$ is a ratio of an integrated intensity $I_{(63°-65°)}$ to an integrated intensity $I_{(65°-66°)}$,
   the integrated intensity) $I_{(65°-66°)}$ is an integrated intensity of a third peak that is a maximum peak present in a range of angle of diffraction 2θ greater than or equal to 65° and less than or equal to 66° in the X-ray diffraction pattern of the positive electrode active material, and the integrated intensity) $I_{(63°\text{-}65°)}$ is an integrated intensity of a fourth peak that is a maximum peak present in a range of angle of diffraction 2θ greater than or equal to 63° and less than or equal to 65° in the X-ray diffraction pattern of the positive electrode active material.

9. The positive electrode active material according to claim 8,
wherein the integrated intensity ratio $I_{(63°\text{-}65°)}/I_{(65°\text{-}66°)}$ is greater than or equal to 1.22 and less than or equal to 1.28.

10. The positive electrode active material according to claim 1,
wherein the second lithium composite oxide is mixed with at least a part of the surface of the first lithium composite oxide to form a solid solution.

11. The positive electrode active material according to claim 1,
wherein a molar ratio of the second lithium composite oxide to the first lithium composite oxide is less than or equal to 50%.

12. The positive electrode active material according to claim 11,
wherein the molar ratio is greater than or equal to 6% and less than or equal to 29%.

13. The positive electrode active material according to claim 1,
wherein the thickness is greater than or equal to 0.5 nanometers and less than or equal to 6 nanometers.

14. The positive electrode active material according to claim 1, wherein the first lithium composite oxide further includes Mn.

15. The positive electrode active material according to claim 14, wherein the first lithium composite oxide further includes Co and Ni.

16. The positive electrode active material according to claim 1, wherein the first lithium composite oxide includes F.

17. The positive electrode active material according to claim 1,
wherein the following four mathematical formulas are satisfied:

$1.15 \leq x \leq 1.3$, $0.7 \leq y \leq 0.85$, $1.8 \leq \alpha \leq 1.95$, and $0.1 \leq \beta \leq 0.2$.

18. The positive electrode active material according to claim 1,
wherein the first lithium composite oxide and the second lithium composite oxide are contained as main components in the positive electrode active material.

19. A battery comprising:
a positive electrode including the positive electrode active material according to claim 1;
a negative electrode; and
an electrolyte.

20. The battery according to claim 19,
wherein the negative electrode includes at least one selected from the group consisting of:
(i) a negative electrode active material capable of occluding and releasing lithium ions; and
(ii) a material that allows lithium metal to dissolve from the material into the electrolyte during discharging and to precipitate on the material during charging, and
wherein the electrolyte is a nonaqueous electrolyte.

21. The battery according to claim 19,
wherein the negative electrode includes at least one selected from the group consisting of:
(i) a negative electrode active material capable of occluding and releasing lithium ions; and
(ii) a material that allows lithium metal to dissolve from the material into the electrolyte during discharging and to precipitate on the material during charging, and
wherein the electrolyte is a solid electrolyte.

22. The positive electrode active material according to claim 1,
wherein the second lithium composite oxide that completely covers all over the surface of the first lithium composite oxide.

23. A positive electrode active material comprising:
a first lithium composite oxide; and
a second lithium composite oxide that covers at least a part of a surface of the first lithium composite oxide,
wherein:
the first lithium composite oxide includes F,
the first lithium composite oxide has a crystal structure belonging to a layered structure,
the second lithium composite oxide has a crystal structure belonging to space group Fd-3m,
the second lithium composite oxide is represented by composition formula $Li_aA_bO_c$,
the second lithium composite oxide has a thickness of greater than or equal to 0.1 nanometers and less than or equal to 30 nanometers,
where
A is at least one element selected from the group consisting of Ni, Co, Mn, Si, Al, P, S, Ti, V, Cr, Fe, Cu, Zn, Ga, Zr, Nb, Mo, Ru, Ta, and W, $0 < a \leq 2$, $1.8 \leq b \leq 2.2$, and $3.5 \leq c \leq 4.5$, and the first lithium composite oxide is represented by composition formula $Li_xMe_yO_\alpha Q_\beta$,
where
Me is at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al,
Q is at least one selected from the group consisting of F, Cl, N, and S, $1.05 \leq x \leq 1.4$, $0.6 \leq y \leq 0.95$, $1.33 \leq \alpha < 2$, and $0.1 \leq \beta \leq 0.67$.

* * * * *